(12) United States Patent
Noonan et al.

(10) Patent No.: US 7,699,404 B2
(45) Date of Patent: Apr. 20, 2010

(54) WHEEL ASSEMBLIES

(75) Inventors: Mark Noonan, New Canaan, CT (US);
Stephen C. Fog, New Canaan, CT (US)

(73) Assignee: Snow Solutions LLC, New Canaan, CT (US)

( * ) Notice: Subject to any disclaimer, the term of this patent is extended or adjusted under 35 U.S.C. 154(b) by 245 days.

(21) Appl. No.: 11/955,892

(22) Filed: Dec. 13, 2007

(65) Prior Publication Data
US 2009/0139116 A1 Jun. 4, 2009

Related U.S. Application Data

(60) Provisional application No. 60/991,217, filed on Nov. 29, 2007.

(51) Int. Cl.
*B60B 5/02* (2006.01)
*B60C 5/16* (2006.01)
(52) U.S. Cl. .................. 301/64.706; 301/91; 152/396
(58) Field of Classification Search .............. 301/9.1, 301/64.301, 64.303, 64.305, 64.307, 64.706, 301/86–88, 91, 95.11, 99; 152/379.3, 380, 152/17, 19, 382, 396, 402–403; 37/264–265
See application file for complete search history.

(56) References Cited

U.S. PATENT DOCUMENTS

| | | | |
|---|---|---|---|
| 237,410 A | 2/1881 | Rouse | |
| 328,633 A | 10/1885 | Angell | |
| 490,829 A * | 1/1893 | Lavigne | 152/158 |
| 617,830 A | 1/1899 | Herran | |
| 909,521 A | 1/1909 | Bearinger | |
| 998,517 A | 7/1911 | Humm | |
| RE13,626 E * | 10/1913 | Overman | 152/325 |
| 1,236,921 A * | 8/1917 | Fraser | 301/81 |
| 1,422,050 A * | 7/1922 | Greenberg | 301/67 |

(Continued)

FOREIGN PATENT DOCUMENTS

CA 2501109 9/2005

(Continued)

OTHER PUBLICATIONS

European Community Registered Design No. 000729942-0001, May 23, 2007, Europe.

(Continued)

*Primary Examiner*—Jason R Bellinger
(74) *Attorney, Agent, or Firm*—Harness, Dickey & Pierce, P.L.C.

(57) ABSTRACT

Various exemplary embodiments are provided of wheel assemblies and tires. In one exemplary embodiment, a wheel assembly generally includes first and second wheel pieces attachable to each other. The first and second wheel pieces may include respective first and second rim portions. Each of the first and second rim portions may include an arced portion that defines only a portion of a circumference of a rim, such that the arced portions collectively define the circumference of the rim when the first and second wheel pieces are attached. The first and second wheel pieces may be slidably engagable in a first axial direction that is substantially parallel to a rotational axis of the wheel assembly. The first and second wheel pieces may be slidably disengagable in a second axial direction that is generally opposite the first axial direction.

38 Claims, 22 Drawing Sheets

U.S. PATENT DOCUMENTS

| | | | |
|---|---|---|---|
| 1,514,076 A | 11/1924 | Brown | |
| 1,683,732 A | 9/1928 | Selin | |
| 2,432,780 A | 12/1947 | Mader | |
| 2,441,449 A | 5/1948 | Shaw | |
| 2,460,560 A | 2/1949 | Williams | |
| 2,470,217 A | 5/1949 | McLoughlin | |
| 2,520,606 A | 8/1950 | McLoughlin | |
| 2,590,143 A | 3/1952 | Adams, Jr. et al. | |
| 2,629,624 A | 2/1953 | Nelles | |
| 2,715,786 A | 8/1955 | Dorko | |
| 2,720,043 A | 10/1955 | Chamberlin | |
| 2,811,792 A | 11/1957 | Cork, Jr. | |
| 2,846,785 A | 8/1958 | Underwood | |
| 2,852,872 A | 9/1958 | Benz | |
| 2,852,873 A | 9/1958 | Benz | |
| 2,863,232 A | 12/1958 | Steinbach et al. | |
| 2,867,827 A | 1/1959 | Gantz | |
| 2,930,152 A | 3/1960 | Pipkin | |
| D190,820 S | 7/1961 | O'Connor | |
| 3,019,056 A | 1/1962 | Keilman | |
| 3,078,604 A | 2/1963 | Neuman | |
| 3,097,541 A | 7/1963 | Kindig | |
| 3,107,446 A | 10/1963 | Messinger | |
| 3,136,574 A | 6/1964 | Pasquale | |
| 3,222,699 A | 12/1965 | Zeisig | |
| 3,343,807 A | 9/1967 | Moraski | |
| 3,452,798 A | 7/1969 | Ravreby | |
| 3,468,041 A | 9/1969 | Mattson et al | |
| 3,469,326 A | 9/1969 | Malickson | |
| 3,475,838 A | 11/1969 | Hagen et al. | |
| 3,526,979 A | 9/1970 | Ladewski | |
| 3,594,932 A | 7/1971 | Eriksson | |
| 3,643,356 A | 2/1972 | Gohl | |
| 3,695,728 A | 10/1972 | Haussels | |
| 3,748,761 A | 7/1973 | Chetwynde | |
| 3,751,058 A | 8/1973 | Larsen | |
| 3,985,392 A | 10/1976 | Bergmann et al. | |
| 4,046,184 A | 9/1977 | Diehl | |
| 4,055,354 A | 10/1977 | Sharpe | |
| 4,153,287 A | 5/1979 | Townsend | |
| 4,161,073 A | 7/1979 | Oakes | |
| 4,179,828 A | 12/1979 | Brunty | |
| 4,214,385 A | 7/1980 | Baranowski et al. | |
| 4,224,751 A | 9/1980 | Schoemann et al. | |
| 4,231,604 A | 11/1980 | Obergfell | |
| D262,259 S | 12/1981 | Terpening | |
| 4,302,894 A | 12/1981 | Emma | |
| 4,345,633 A | 8/1982 | Gilmore | |
| 4,607,860 A | 8/1986 | Vogel | |
| 4,690,447 A | 9/1987 | Adams | |
| 4,704,758 A | 11/1987 | Hoffman | |
| 4,818,034 A * | 4/1989 | Djerf | 301/64.706 |
| 4,858,348 A | 8/1989 | Lundy | |
| 4,865,373 A | 9/1989 | Hudson | |
| 4,910,893 A | 3/1990 | Asay | |
| D314,318 S | 2/1991 | Uimonen | |
| 5,018,282 A | 5/1991 | Hong | |
| 5,048,206 A | 9/1991 | Jones | |
| 5,054,278 A | 10/1991 | Thorndike | |
| 5,074,064 A | 12/1991 | Nickels | |
| 5,117,530 A | 6/1992 | Rank | |
| 5,123,187 A | 6/1992 | Zamaria | |
| 5,159,769 A | 11/1992 | Odorisio | |
| 5,279,102 A | 1/1994 | Foster | |
| 5,487,530 A | 1/1996 | McCullough | |
| 5,499,852 A | 3/1996 | Seigendall | |
| 5,511,327 A | 4/1996 | Jurkowski et al. | |
| 5,551,763 A * | 9/1996 | Alsman | 301/64.706 |
| D375,235 S | 11/1996 | Spear et al. | |
| D376,965 S | 12/1996 | Spear et al. | |
| 5,581,915 A | 12/1996 | Lobato | |
| 5,613,354 A | 3/1997 | Foster | |
| 5,727,799 A | 3/1998 | DiSario | |
| 5,762,405 A | 6/1998 | Dempsey | |
| 5,782,518 A | 7/1998 | Scruggs | |
| 5,782,540 A | 7/1998 | Camfield et al. | |
| 5,810,408 A | 9/1998 | Armstrong | |
| 5,826,948 A | 10/1998 | Schroeder et al. | |
| 5,918,921 A | 7/1999 | Samuelson | |
| D415,663 S | 10/1999 | Whitehead et al. | |
| 5,970,692 A | 10/1999 | Foster | |
| 6,050,576 A | 4/2000 | Tanner et al. | |
| 6,053,548 A | 4/2000 | Bowles, Jr. | |
| 6,139,040 A | 10/2000 | Dempsey | |
| 6,163,986 A | 12/2000 | Townsend | |
| 6,237,975 B1 | 5/2001 | Drobot | |
| 6,286,572 B1 * | 9/2001 | Chen | 152/84 |
| 6,334,640 B1 | 1/2002 | Werner et al. | |
| 6,364,424 B1 | 4/2002 | Lashlee et al. | |
| 6,398,313 B1 * | 6/2002 | Lew | 301/95.102 |
| D459,641 S | 7/2002 | Guneysu | |
| 6,415,588 B1 | 7/2002 | Kao | |
| 6,428,114 B1 * | 8/2002 | Sebode | 301/64.705 |
| 6,457,757 B2 | 10/2002 | Hendrick | |
| 6,474,007 B1 | 11/2002 | Wueshige et al. | |
| 6,523,839 B2 | 2/2003 | Simmons et al. | |
| 6,643,958 B1 | 11/2003 | Krejci | |
| 6,675,507 B2 | 1/2004 | Petruzzelli | |
| 6,701,913 B1 | 3/2004 | LeDuc et al. | |
| 6,726,292 B1 * | 4/2004 | Schroeder et al. | 301/64.704 |
| 6,735,887 B1 | 5/2004 | Muzzammel | |
| 6,922,920 B1 | 8/2005 | Stratz | |
| D523,710 S | 6/2006 | Noonan | |
| D525,093 S | 7/2006 | Noonan et al. | |
| 7,100,313 B2 | 9/2006 | Scherer | |
| 7,111,418 B2 | 9/2006 | Noonan | |
| D543,807 S | 6/2007 | Noonan et al. | |
| D546,144 S | 7/2007 | Noonan et al. | |
| D555,565 S | 11/2007 | Noonan et al. | |
| 7,305,779 B1 | 12/2007 | Purvis | |
| 2005/0160632 A1 | 7/2005 | Williams | |
| 2005/0160633 A1 | 7/2005 | Noonan | |
| 2006/0265913 A1 | 11/2006 | Noonan et al. | |
| 2007/0013198 A1 | 1/2007 | Brazeau | |
| 2007/0227048 A1 | 10/2007 | Adinata | |

FOREIGN PATENT DOCUMENTS

| | | |
|---|---|---|
| CN | 1699696 | 11/2005 |
| EP | 1 580 322 | 3/2005 |
| FR | 865426 | 5/1941 |
| JP | 2005-273450 | 10/2005 |
| WO | WO 2005/098142 | 10/2005 |
| WO | WO 2007/025183 | 3/2007 |

OTHER PUBLICATIONS

European Community Registered Design No. 000729942-0002, May 23, 2007, Europe.
Field Corn Planter, http://etc.usf.edu/clipart/4200/4213/planter_5.htm, Mar. 11, 2005, 2 pages.
Two Photographs of Wovel® Wheeled Shovel, Jan. 2005.

* cited by examiner

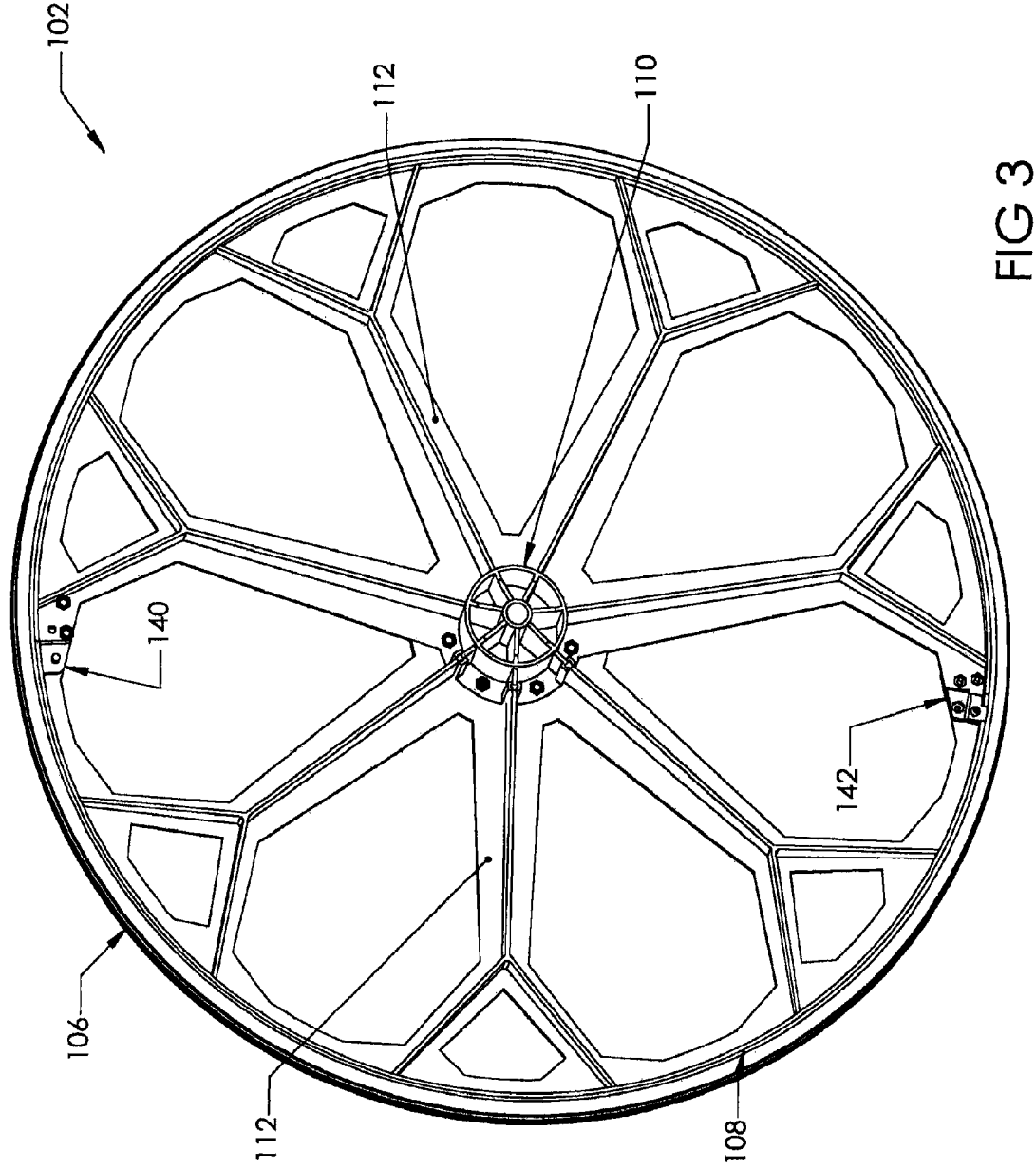

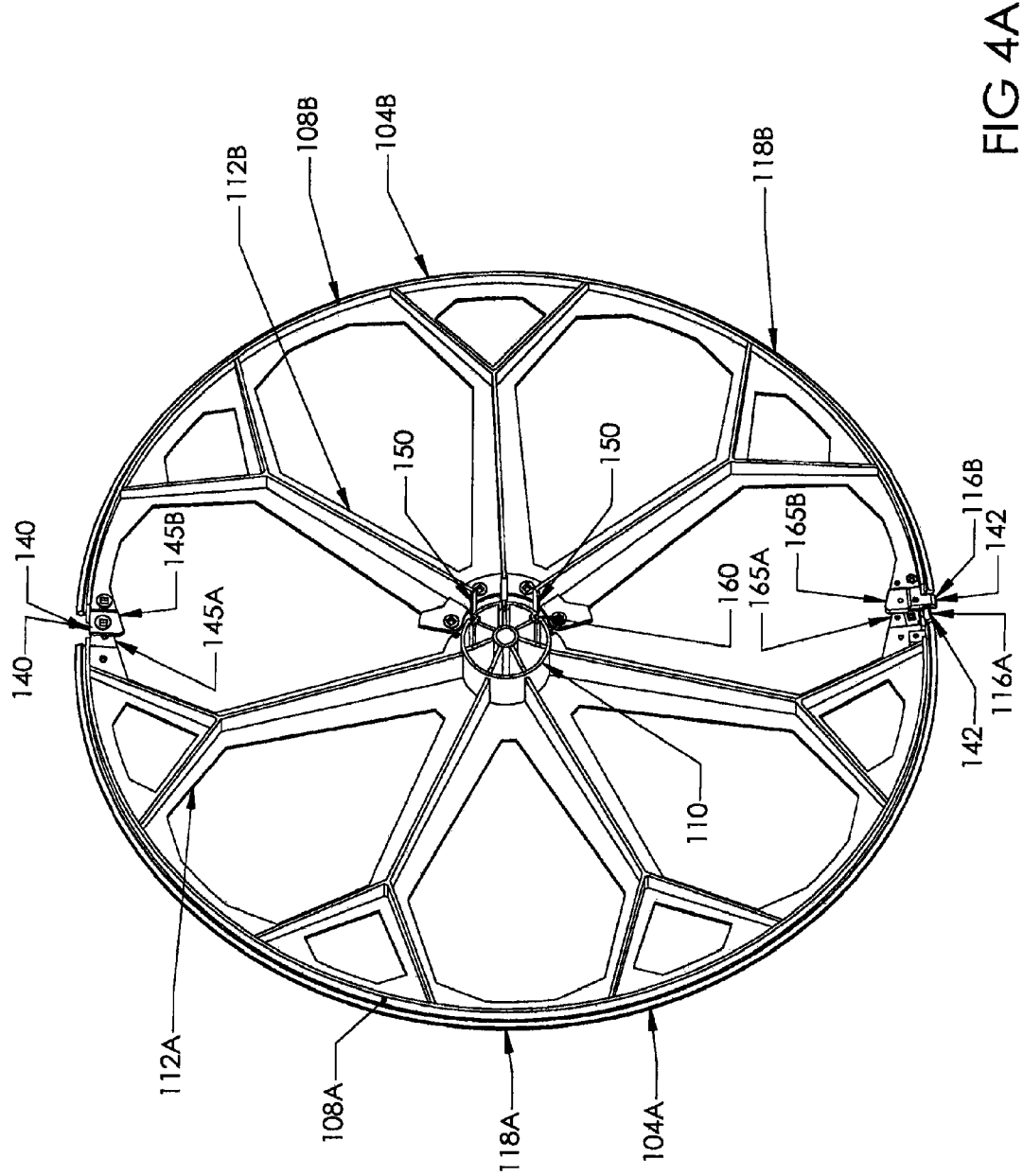

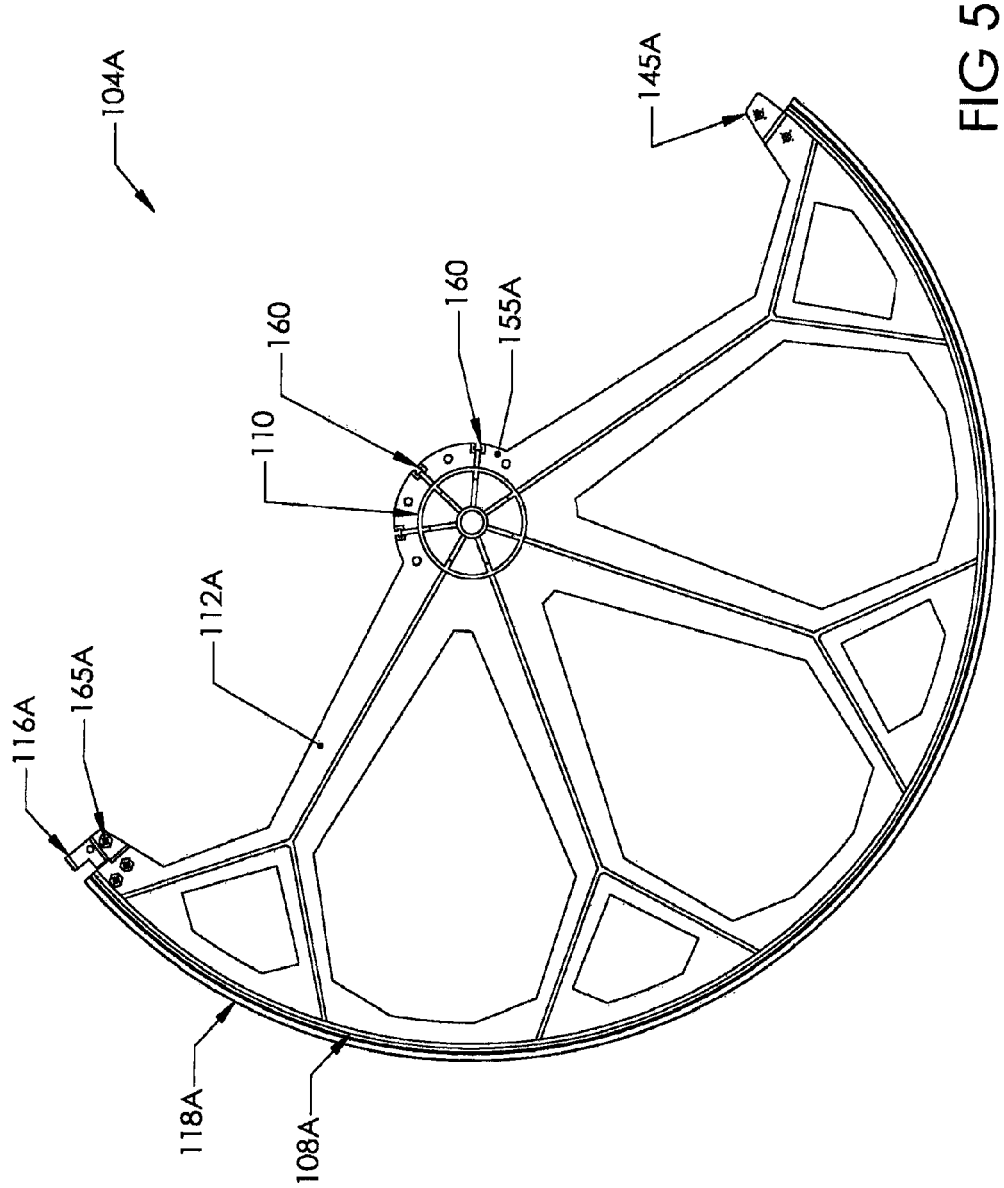

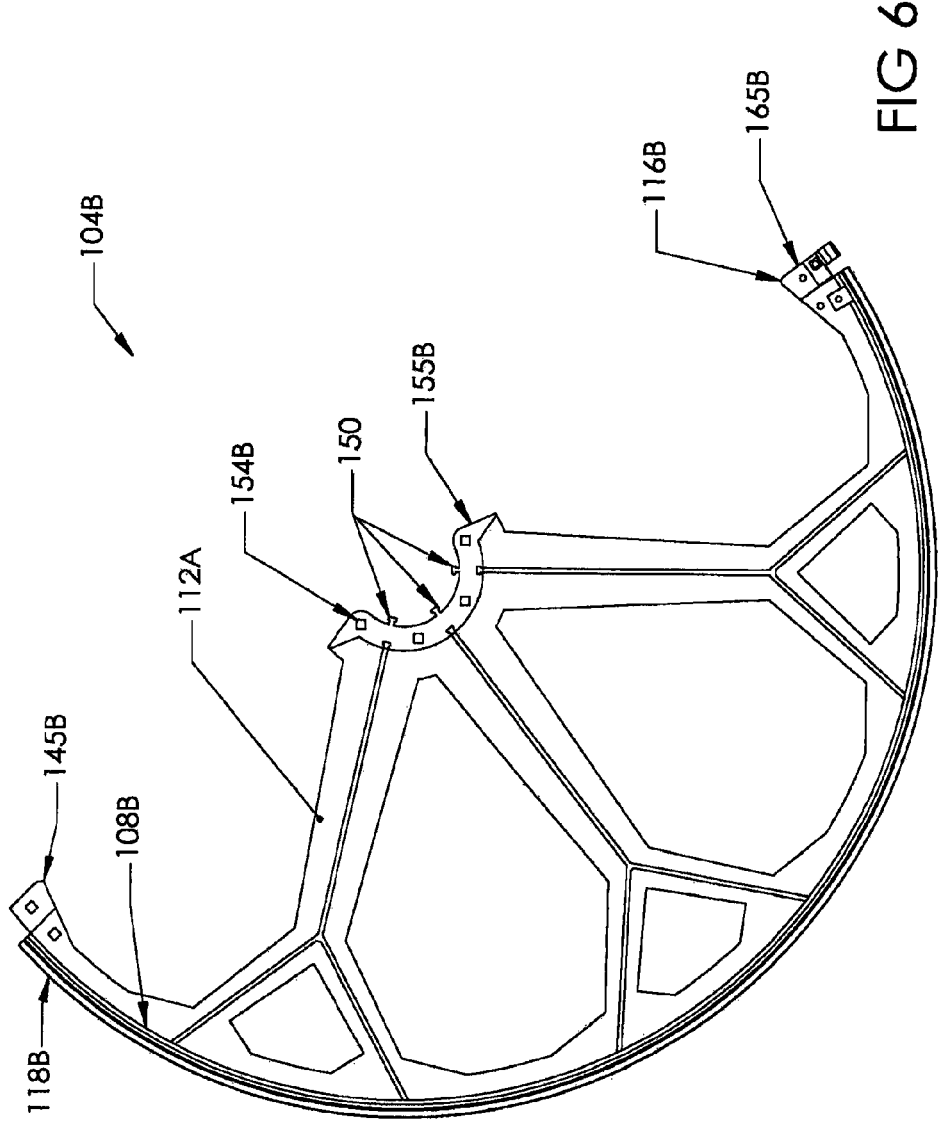

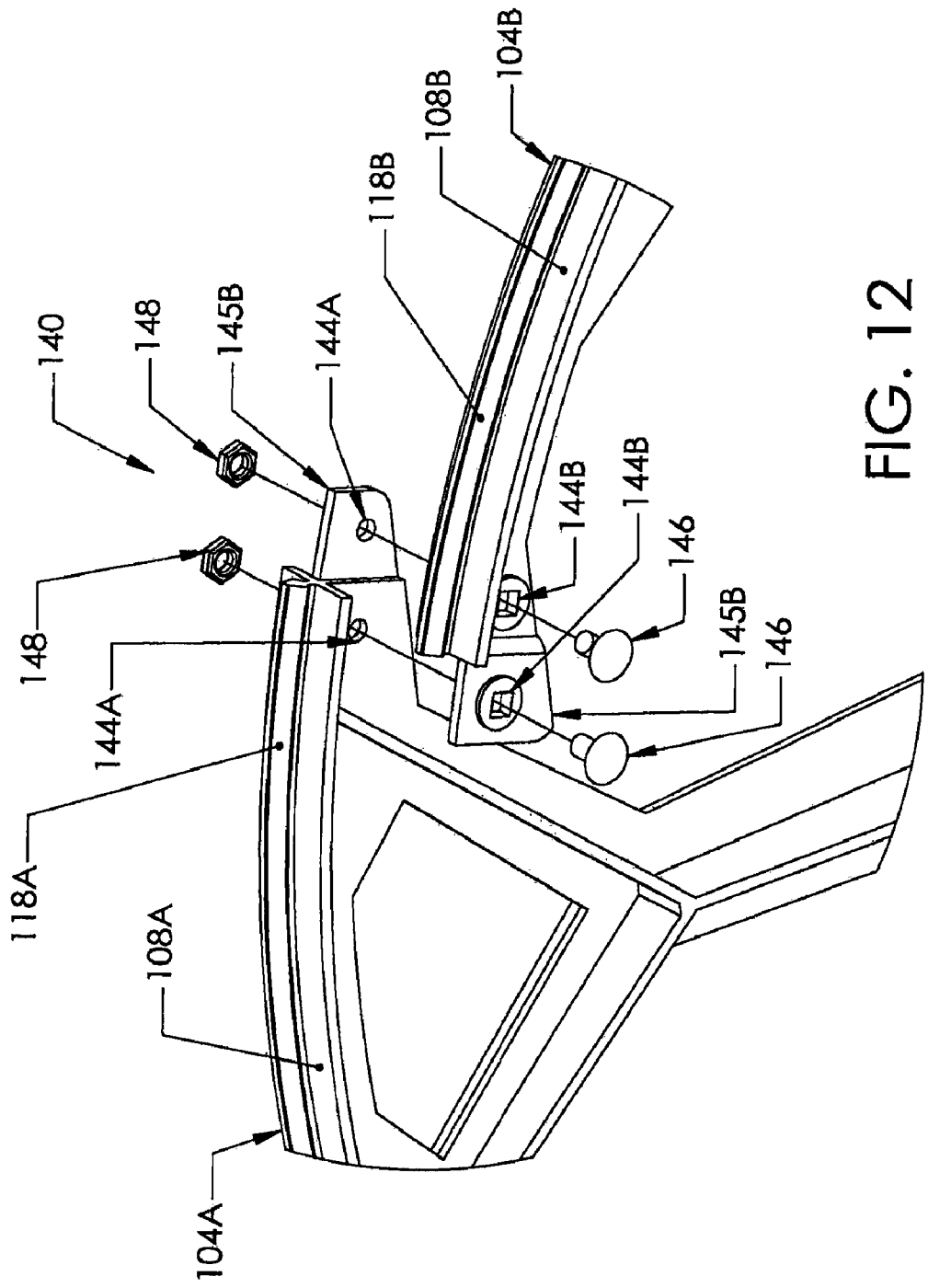

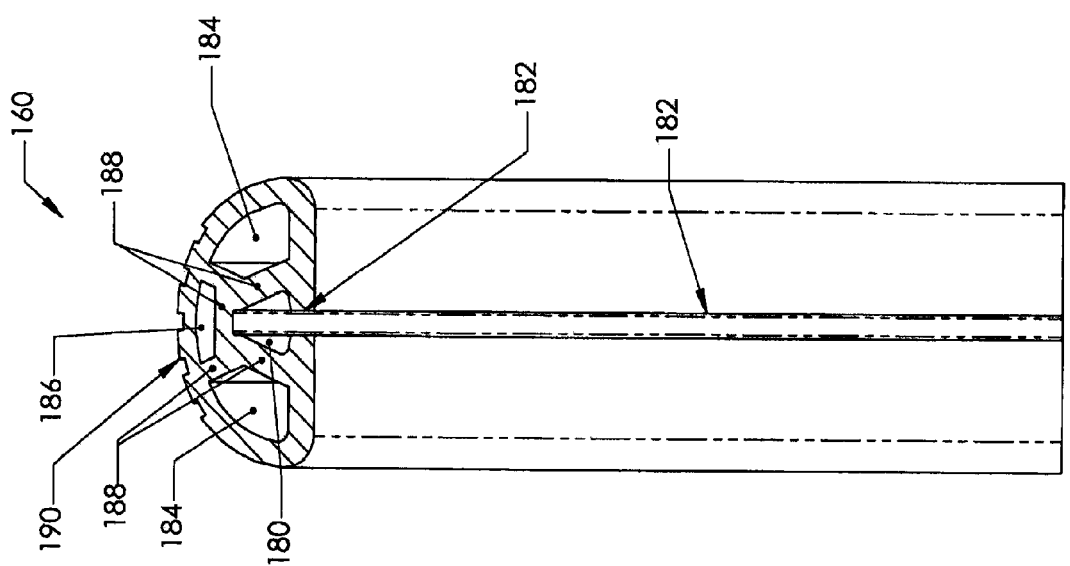

WHEEL ASSEMBLIES

CROSS-REFERENCE TO RELATED APPLICATION

This application claims the benefit of U.S. Provisional Application No. 60/991,217 filed Nov. 29, 2007. The disclosure of the above application is incorporated herein by reference.

FIELD

The present disclosure generally relates (but not exclusively) to wheel assemblies.

BACKGROUND

The statements in this background section merely provide background information related to the present disclosure and may not constitute prior art.

There are numerous types of wheeled vehicles, such as bicycles and manually-operated wheeled vehicles to assist in transporting materials from one place to another. The wheelbarrow is an example of a wheeled vehicle that may be used to transport material.

SUMMARY

According to various aspects of the present disclosure, there are provided various exemplary embodiments of wheel assemblies and tires. Further aspects relate to methods of using wheel assemblies and tires. Additional aspects relate to methods of making wheel assemblies and tires. Other aspects relate to tools or devices that include a wheel assembly or tire.

In one exemplary embodiment, a wheel assembly generally includes first and second wheel pieces releasably attachable to each other. The first and second wheel pieces are slidably engagable in a first axial direction that is substantially parallel to a rotational axis of the wheel assembly. The first and second wheel pieces are slidably disengagable in a second axial direction that is generally opposite the first axial direction. The first and second wheel pieces include respective first and second rim portions that cooperatively define a rim for receiving a tire thereon when the first and second wheel pieces are slidably engaged.

In another exemplary embodiment, a wheel assembly generally includes a rim. A protrusion extends generally outwardly and circumferentially along at least a portion of the rim. A tire includes an outer surface portion and an inner surface portion. The tire also includes an internal chamber complementary in shape to the protrusion for engagingly receiving the protrusion therein. There is an opening along at least a portion of the tire's inner surface portion into the internal chamber for allowing the protrusion to be engagingly received within the internal chamber. Engagement of the protrusion with the internal chamber helps retain the positioning of the tire relative to the protrusion.

In another exemplary embodiment, a wheel assembly generally includes a rim. First and second tire locking tabs extend outwardly relative to the rim. A tire includes an outer surface portion and an inner surface portion. The tire also includes first and second internal chambers and first and second openings into the respective first and second lateral internal chambers for receiving therein at least an end portion of the respective first and second tire locking tabs. Engagement of the first and second tire locking tabs with the respective first and second internal chambers helps retain the positioning of the tire relative to the rim.

In another exemplary embodiment, a wheel assembly generally includes first and second wheel pieces attachable to each other. The first and second wheel pieces include respective first and second rim portions. Each of the first and second rim portions includes an arced portion that defines only a portion of a circumference of a rim such that the arced portions collectively define the circumference of the rim when the first and second wheel pieces are attached. At least one of the first and second wheel pieces includes a mounting hub adapted to receive an axle for rotatably mounting the wheel assembly.

Another exemplary embodiment includes a tire for a wheel assembly having a mounting hub, a rim, and a protrusion extending generally outwardly, circumferentially along at least a portion of the rim. In this exemplary embodiment, the tire generally includes an outer surface portion and an inner surface portion. The tire also includes an internal chamber complementary in shape to the protrusion of the wheel assembly for engagingly receiving the protrusion therein. There is an opening along at least a portion of the tire's inner surface portion into the internal chamber for allowing the protrusion to be engagingly received within the internal chamber. Engagement of the protrusion into the internal chamber of the tire helps retain the positioning of the tire relative to the protrusion of the wheel assembly.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

FIG. 3 is a perspective view of the multi-piece wheel assembly shown in FIG. 1;

FIGS. 4A and 4B are exploded perspective views of the multi-piece wheel assembly shown in FIG. 3 with the tire removed, and illustrating the two wheel pieces aligned for sliding engagement with each other;

FIG. 5 is a side view of one of the two wheel pieces shown in FIG. 4, and illustrating the hub and slots of the wheel piece;

FIG. 6 is a side view of the other wheel piece shown in FIG. 4, and illustrating the generally T-shaped engagement members that are slidably receivable within the corresponding slots of the wheel piece shown in FIG. 5;

Figure 9:
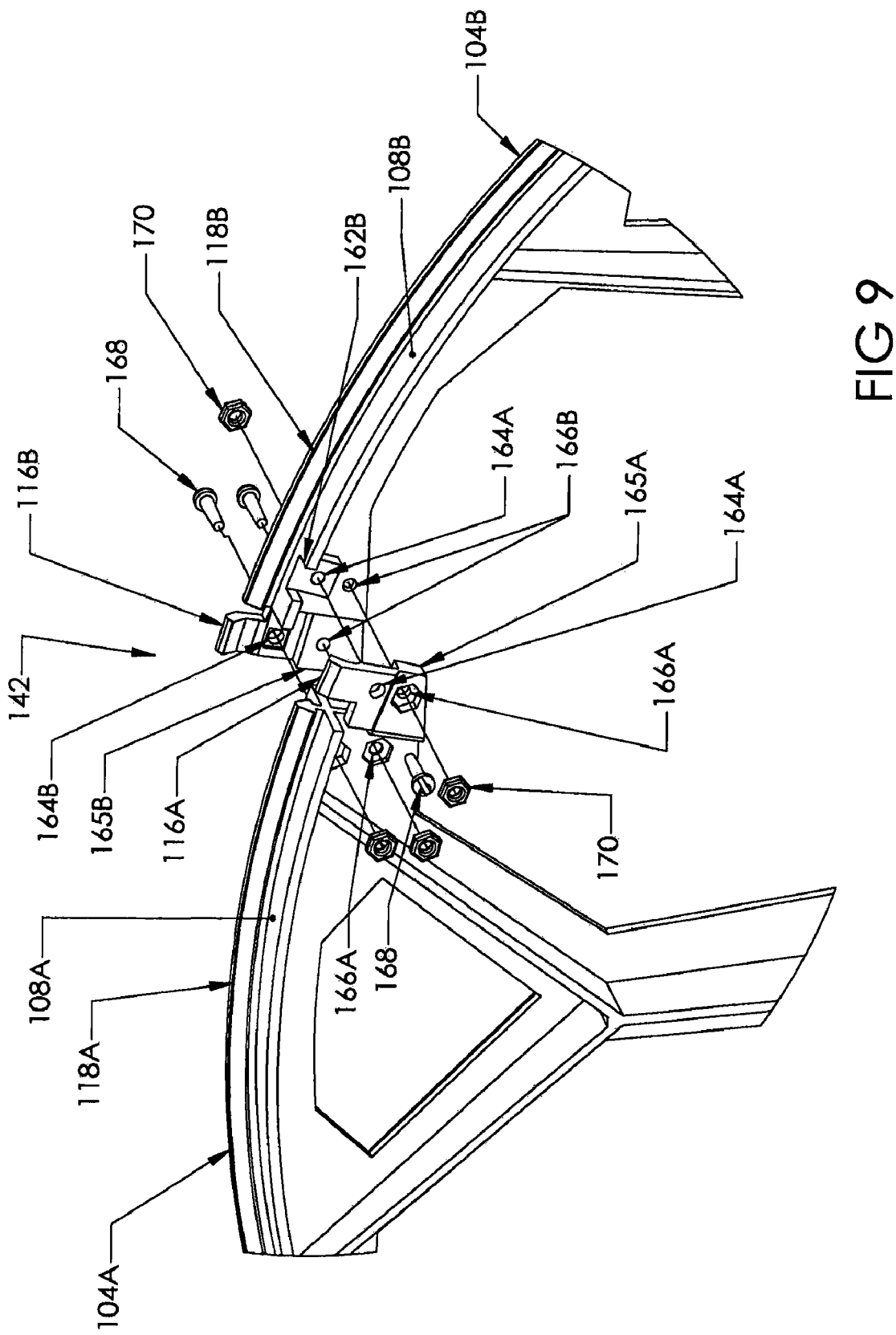
Figure 10:
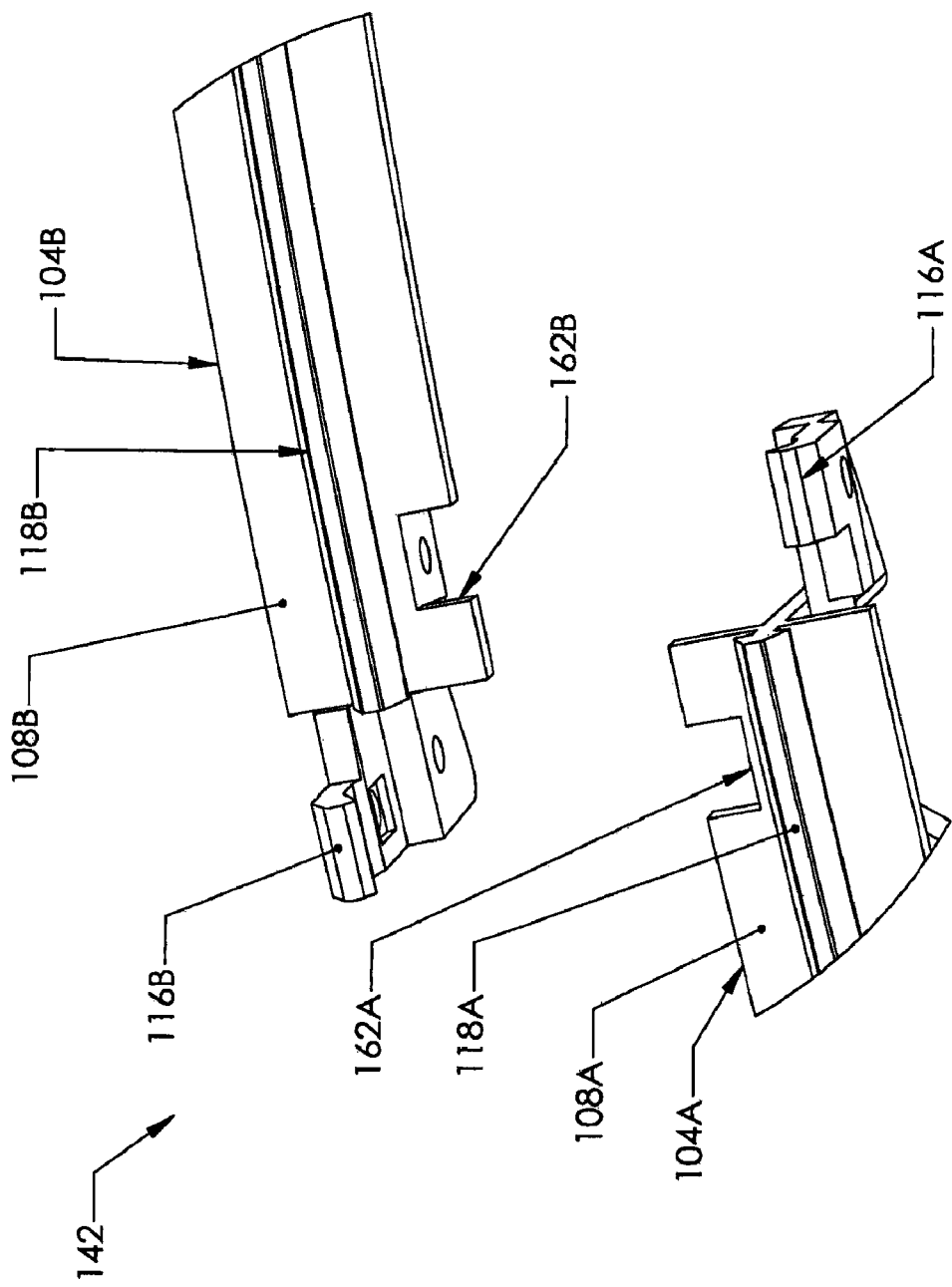
Figure 11:
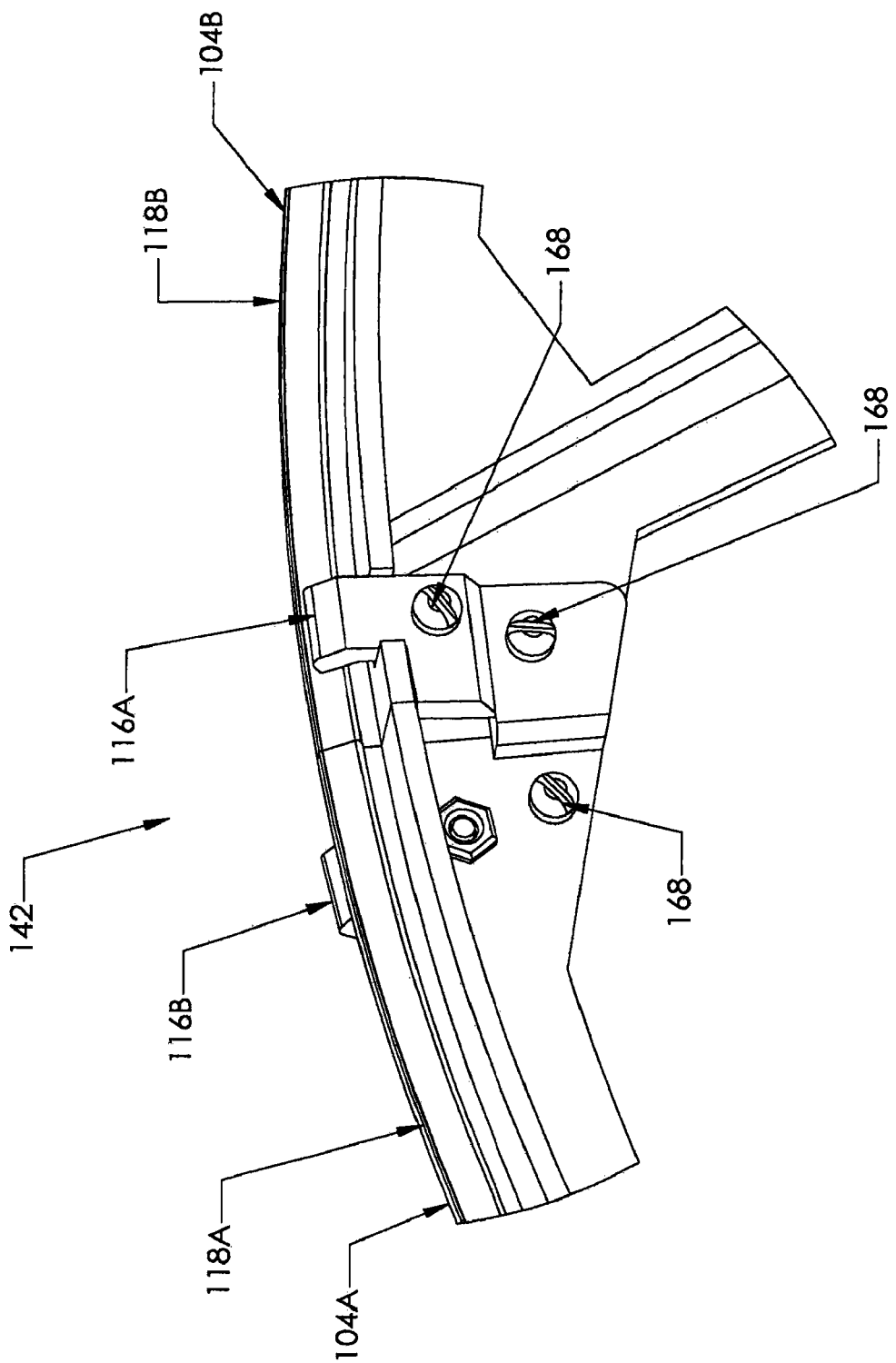
Figure 13A:
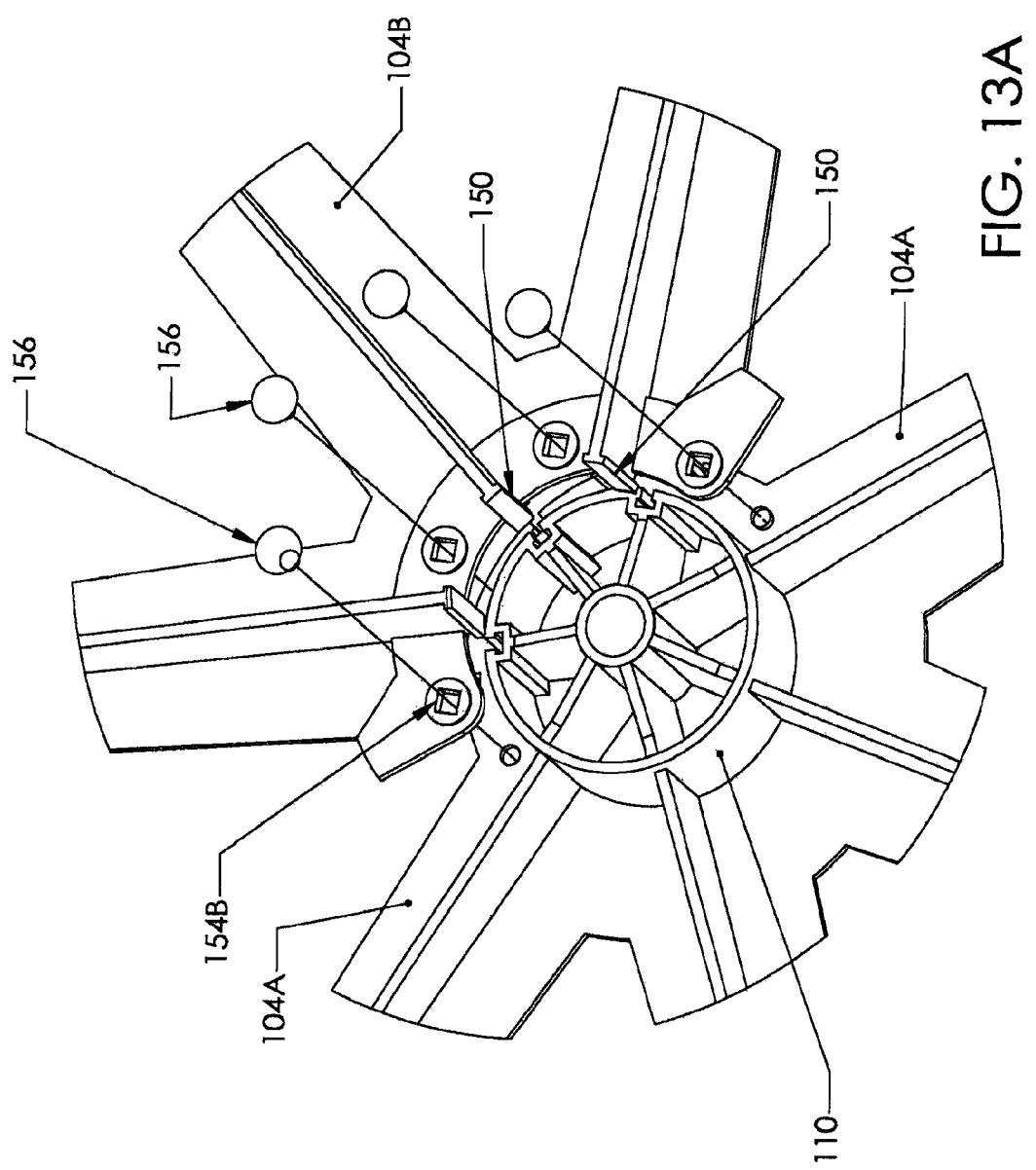
Figure 13B:
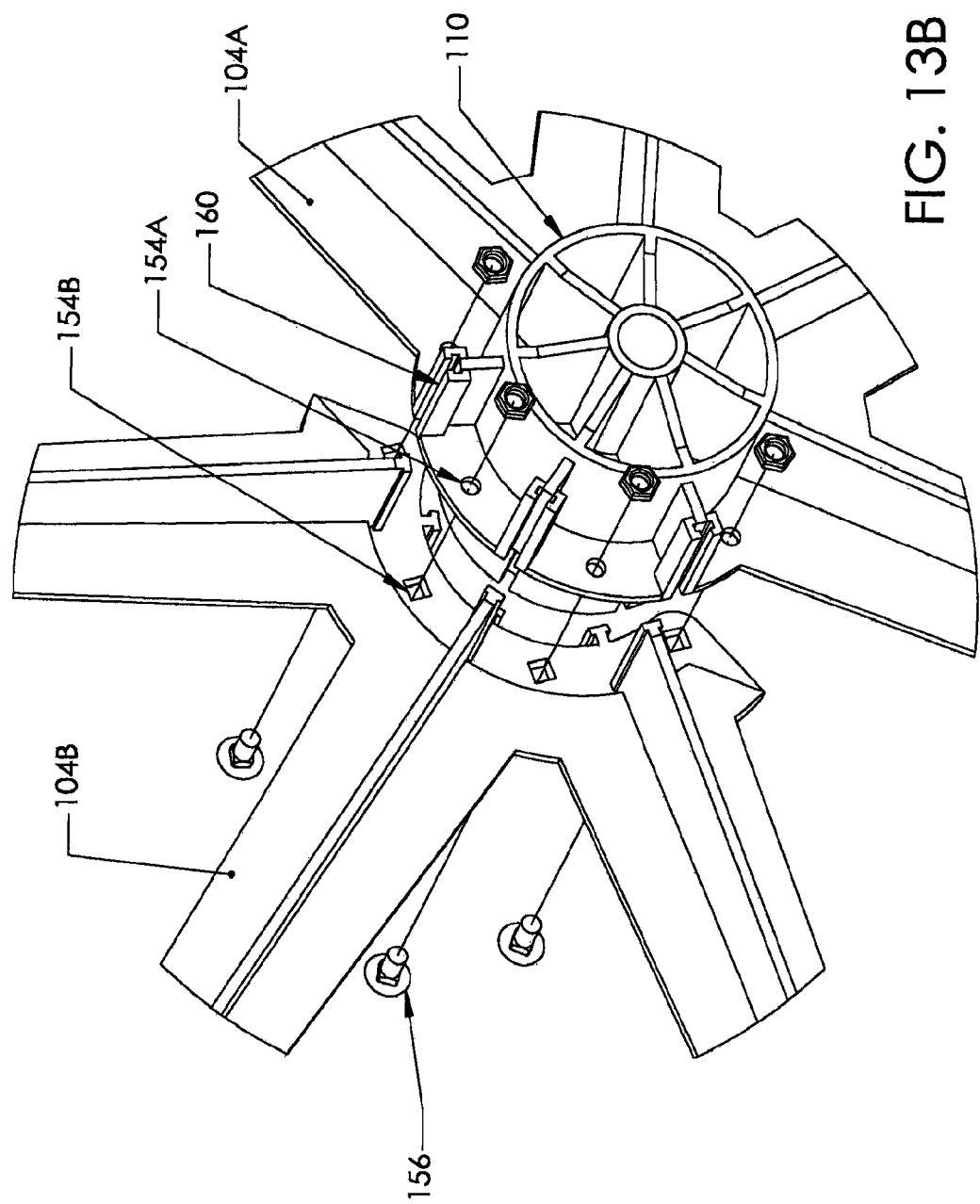
Figure 14:
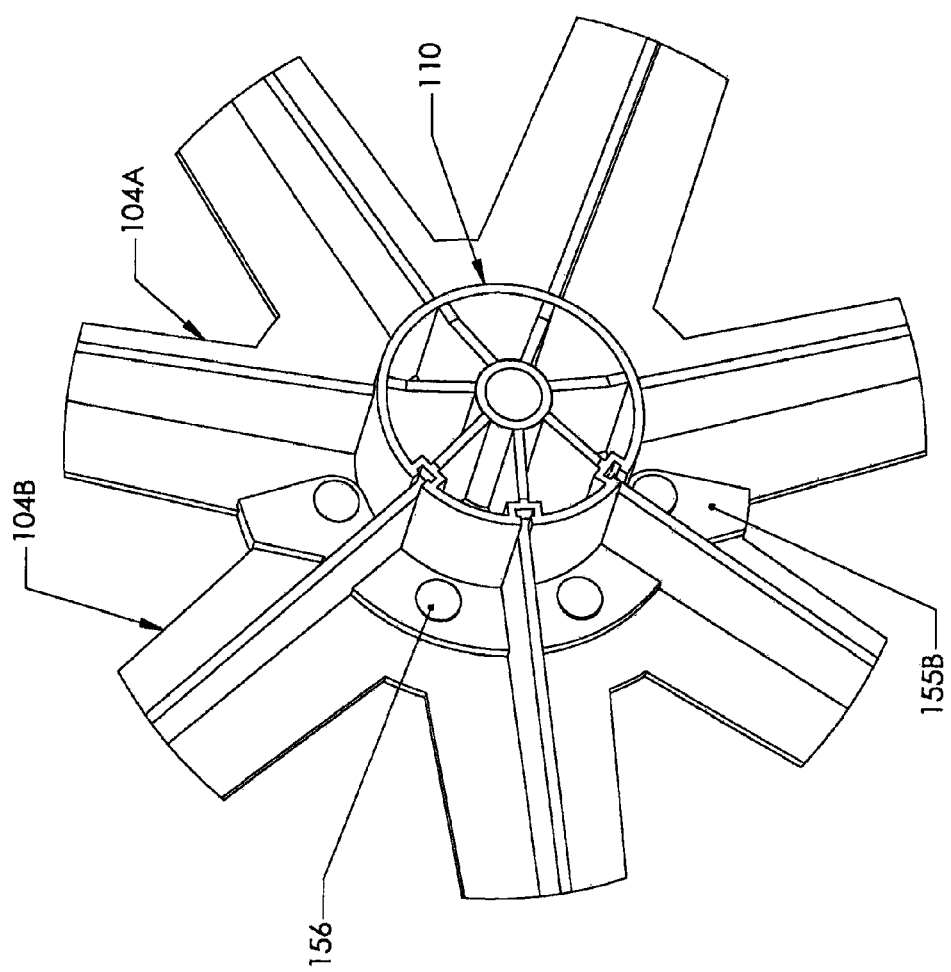
Figure 15A:
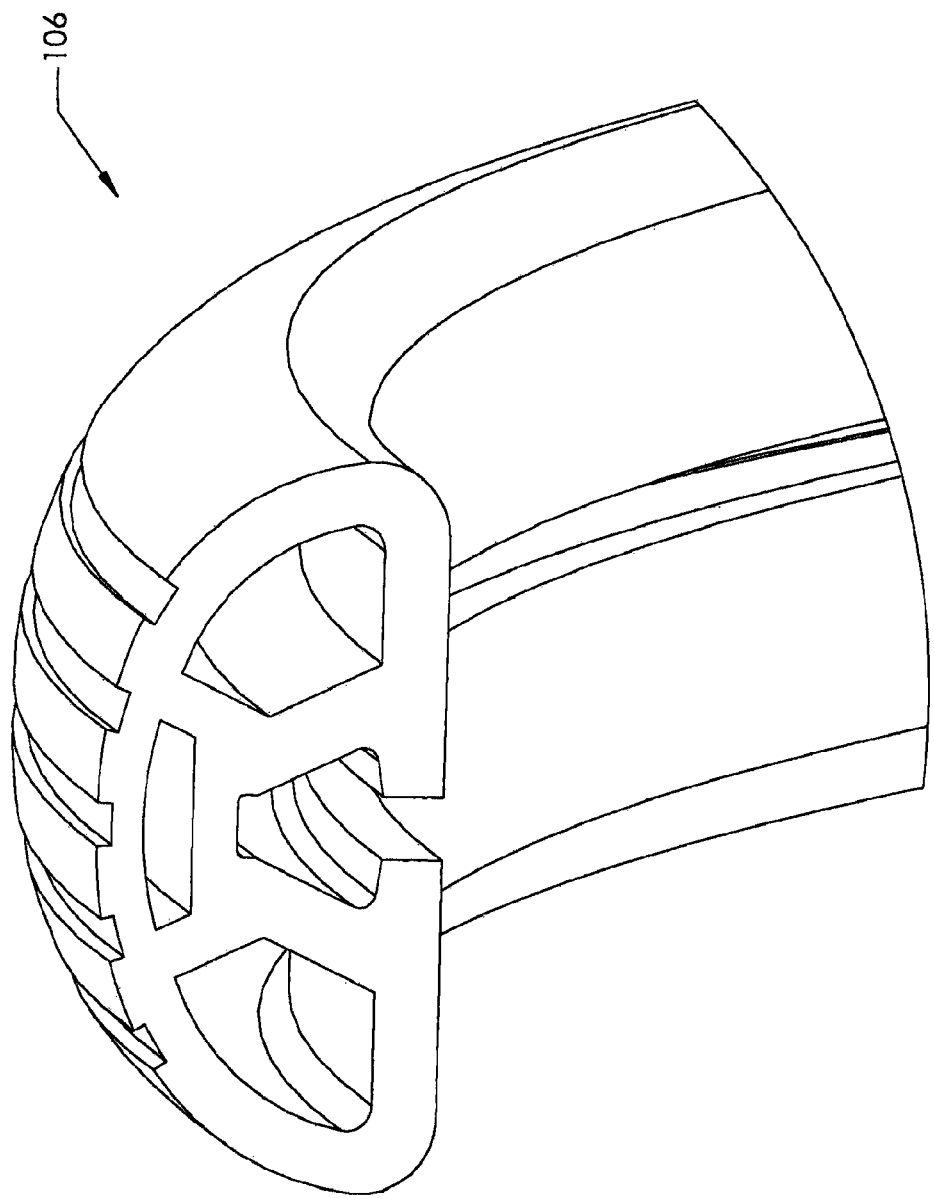
Figure 16:
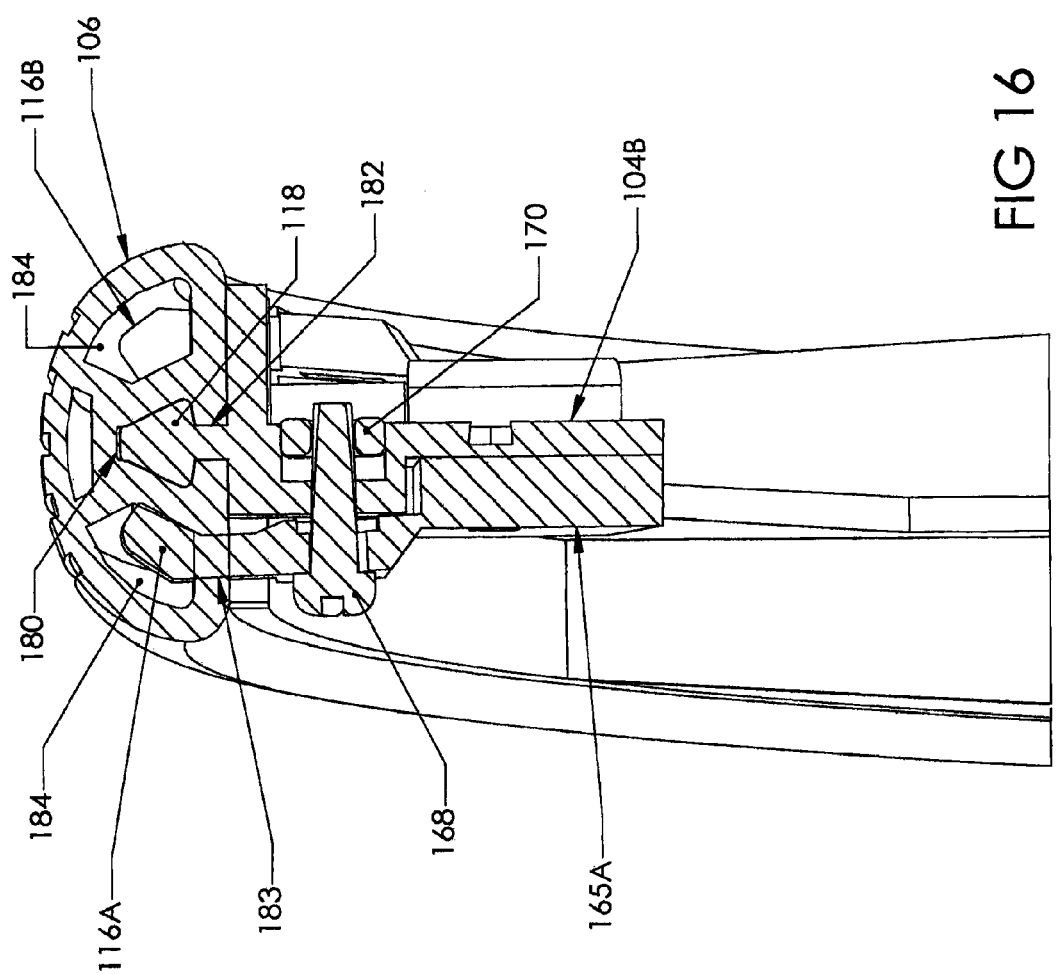
Figure 17:
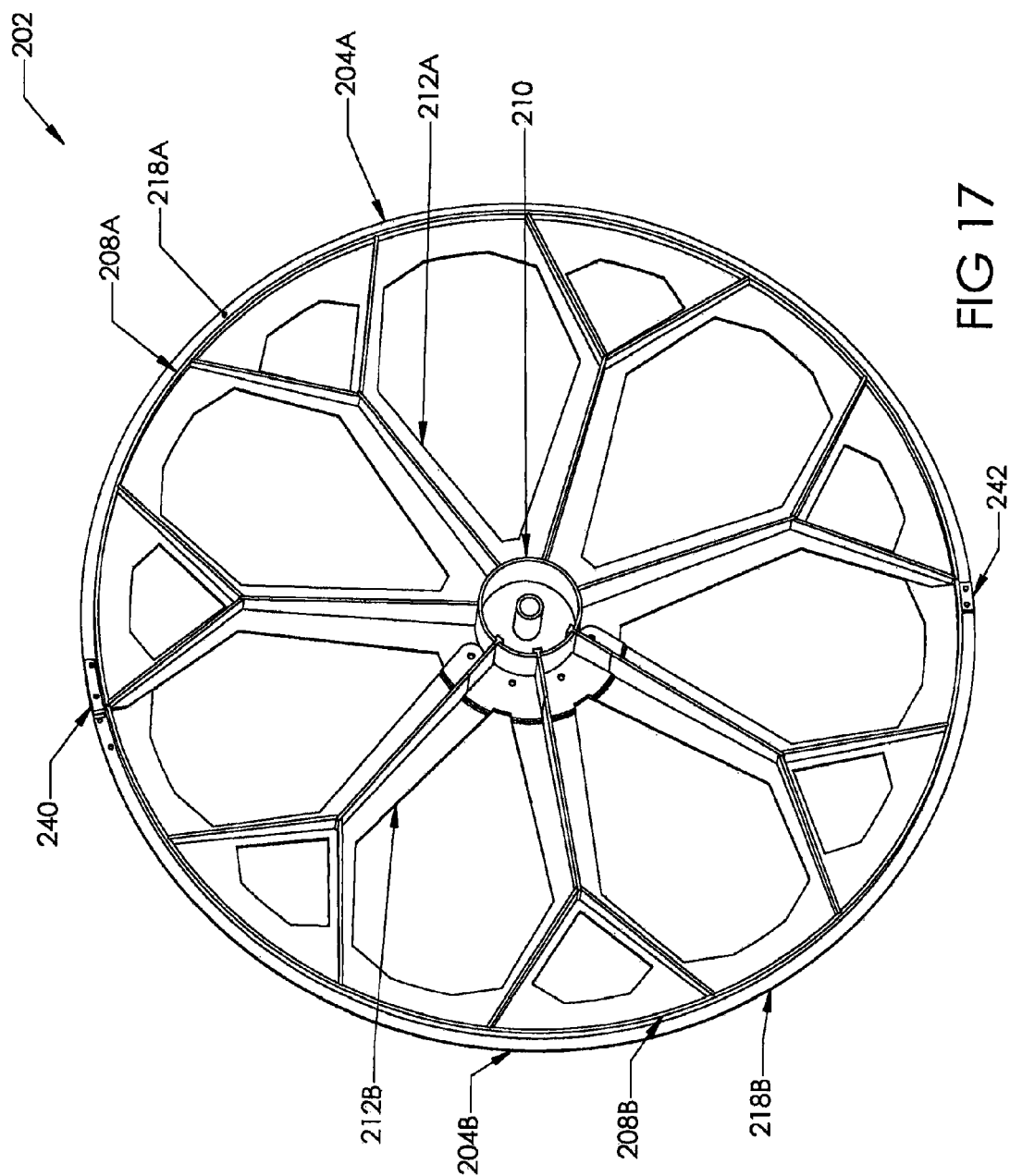
Figure 18A:
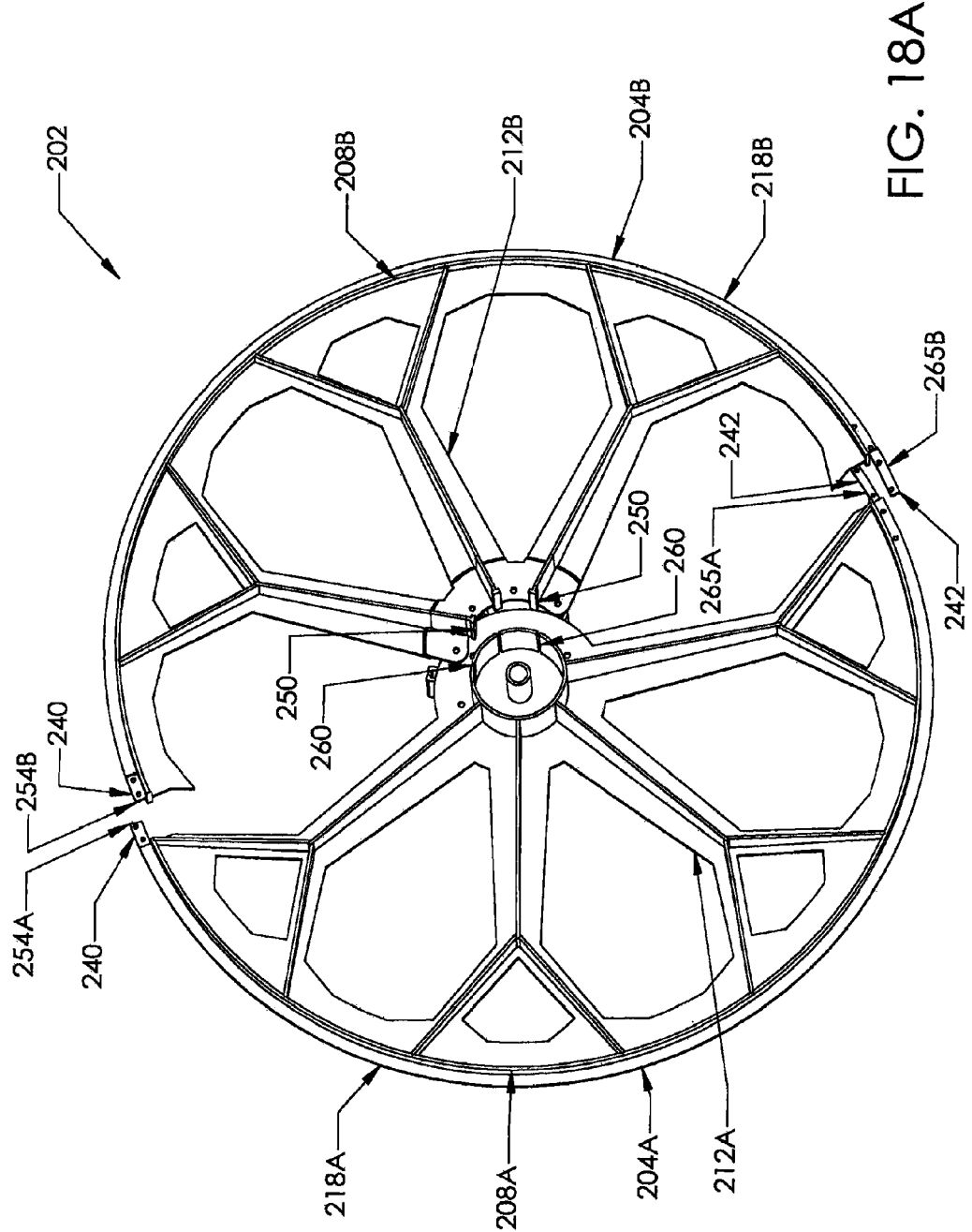
Figure 18B:
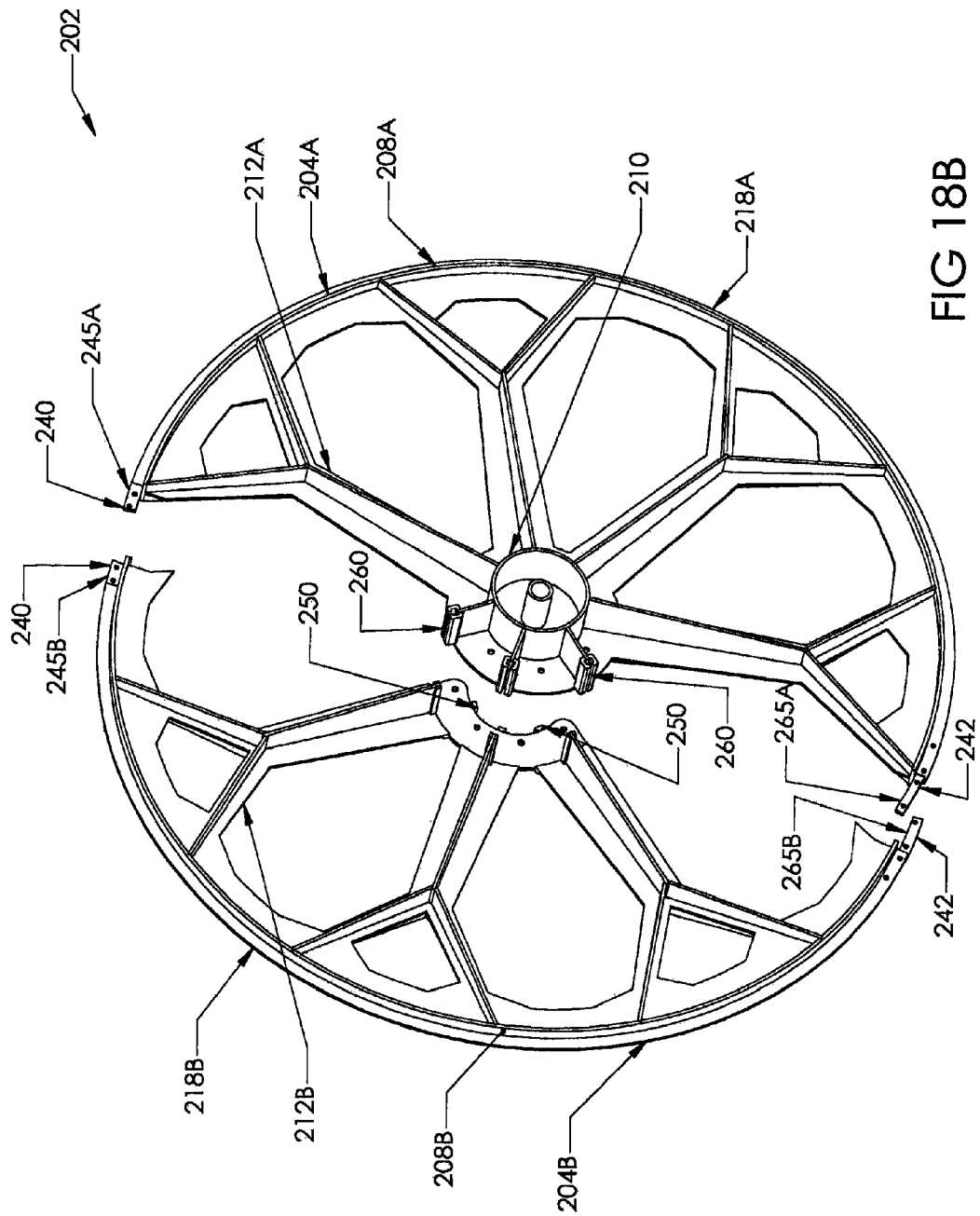

FIG. 9 is a partial perspective of the wheel pieces shown in FIG. 4, and illustrating one of the joints between the wheel pieces, generally opposing tire locking tabs, protrusions/barb members extending circumferentially along the rim, and exemplary mechanical fasteners that may be used for releasably attaching the wheel pieces to each other at the joint and for urging the generally opposing tire locking tabs towards each other;

FIG. 10 is another partial perspective illustrating the generally opposing tire locking tabs and protrusions/barb members shown in FIG. 9;

FIG. 11 is a partial perspective view of the wheel pieces shown in FIG. 9 after being assembled and releasably attached to each other;

FIG. 12 is a partial perspective of the wheel pieces shown in FIG. 4, and illustrating the other joint between one of the wheel pieces and exemplary mechanical fasteners that may be used for releasably attaching the wheel pieces to each other at the other joint;

FIGS. 13A and 13B are exploded partial perspective views of the wheel pieces shown in FIG. 4, and illustrating the mounting hub, generally T-shaped engagement members aligned for slidable engagement with the complimentary T-shaped slots, and axially-overlapping flange members having corresponding fastener hole patterns with the fastener holes aligned for receiving exemplary mechanical fasteners that may be used for releasably attaching the overlapping flange members to each other;

FIG. 14 is a partial perspective view of the wheel pieces shown in FIGS. 13A and 13B after the generally T-shaped engagement members have been fully, slidably engaged into the T-shaped slots, and the exemplary mechanical fasteners releasably attaching the axially-overlapping flange members to each other;

FIG. 15 is a partial perspective view illustrating an exemplary internal construction for the tire of the multi-piece wheel assembly shown in FIG. 3 according to an exemplary embodiment;

FIG. 15A is an enlarged partial perspective view of the exemplary internal tire construction shown in FIG. 15;

FIG. 16 is a partial perspective, cross-sectional schematic view of the wheel assembly shown in FIG. 3, and illustrating the exemplary attachment of the tire and rim with the tire locking tabs urging the tire to the protrusions/barb members received within the internal cavity of the tire, and also illustrating the exemplary mechanical fasteners that may be used for urging the tire locking tabs inwardly towards the protrusions/barb members from their initial position;

FIG. 17 is a perspective view of a multi-piece wheel assembly according to another exemplary embodiment; and FIGS. 18A and 18B are exploded perspective views of the multi-piece wheel assembly shown in FIG. 17, and illustrating the wheel pieces aligned for sliding engagement with each other.

DETAILED DESCRIPTION

The following description is merely exemplary in nature and is in no way intended to limit the present disclosure, application, or uses.

According to various aspects of the present disclosure, there are provided various exemplary embodiments of wheel assemblies and tires. Further aspects relate to methods of using wheel assemblies and tires. Additional aspects relate to methods of making wheel assemblies and tires. Other aspects relate to tools, devices, etc. that include such wheel assemblies and/or tires (e.g., wheeled shovel, etc.).

Any one or more aspects disclosed herein may be implemented individually or in any combination with any one or more of the other disclosed aspects.

Figure 1:
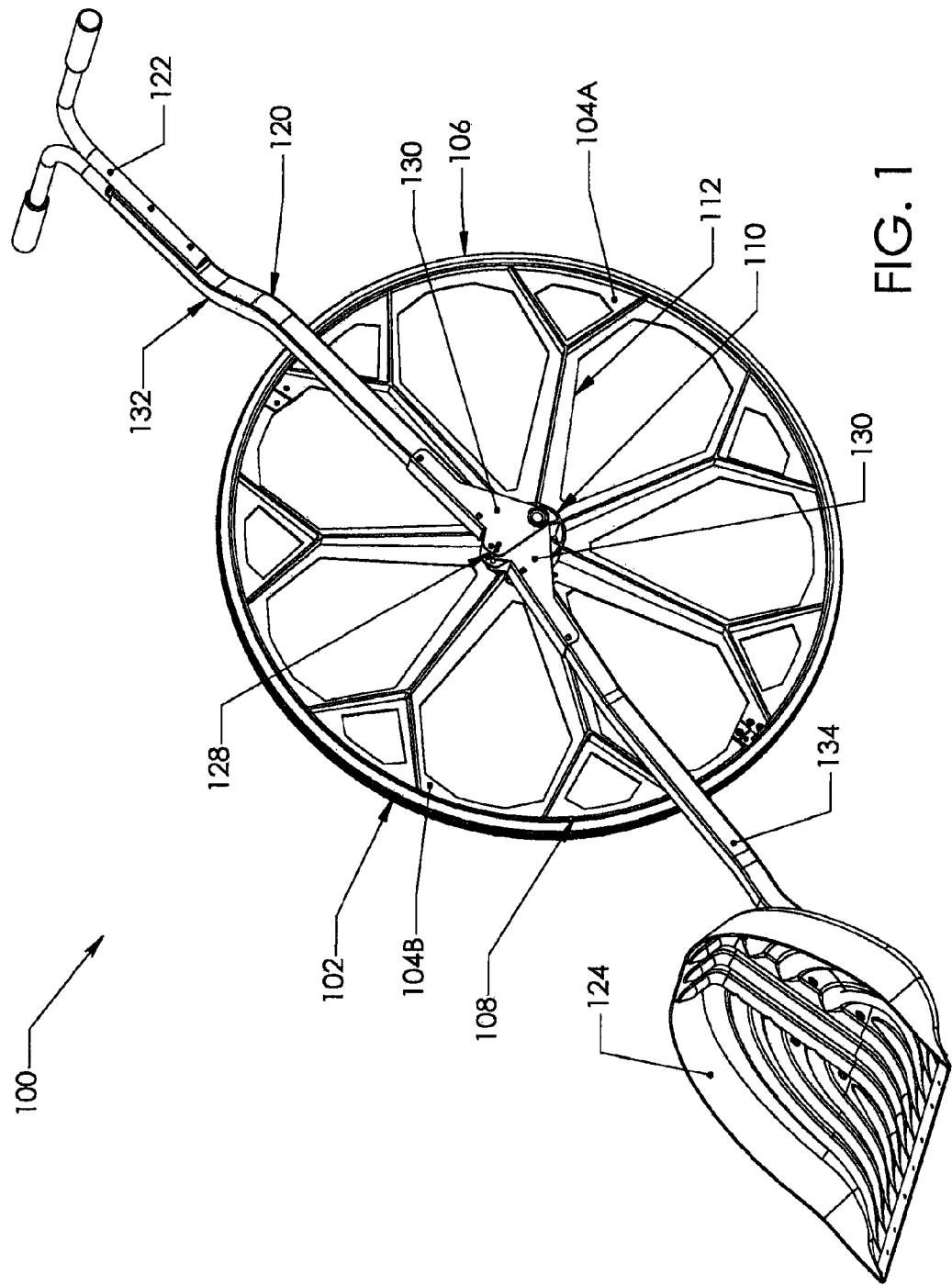
FIG. 1 is a perspective view of a wheeled shovel with a multi-piece wheel assembly according to an exemplary embodiment.
Figure 2:
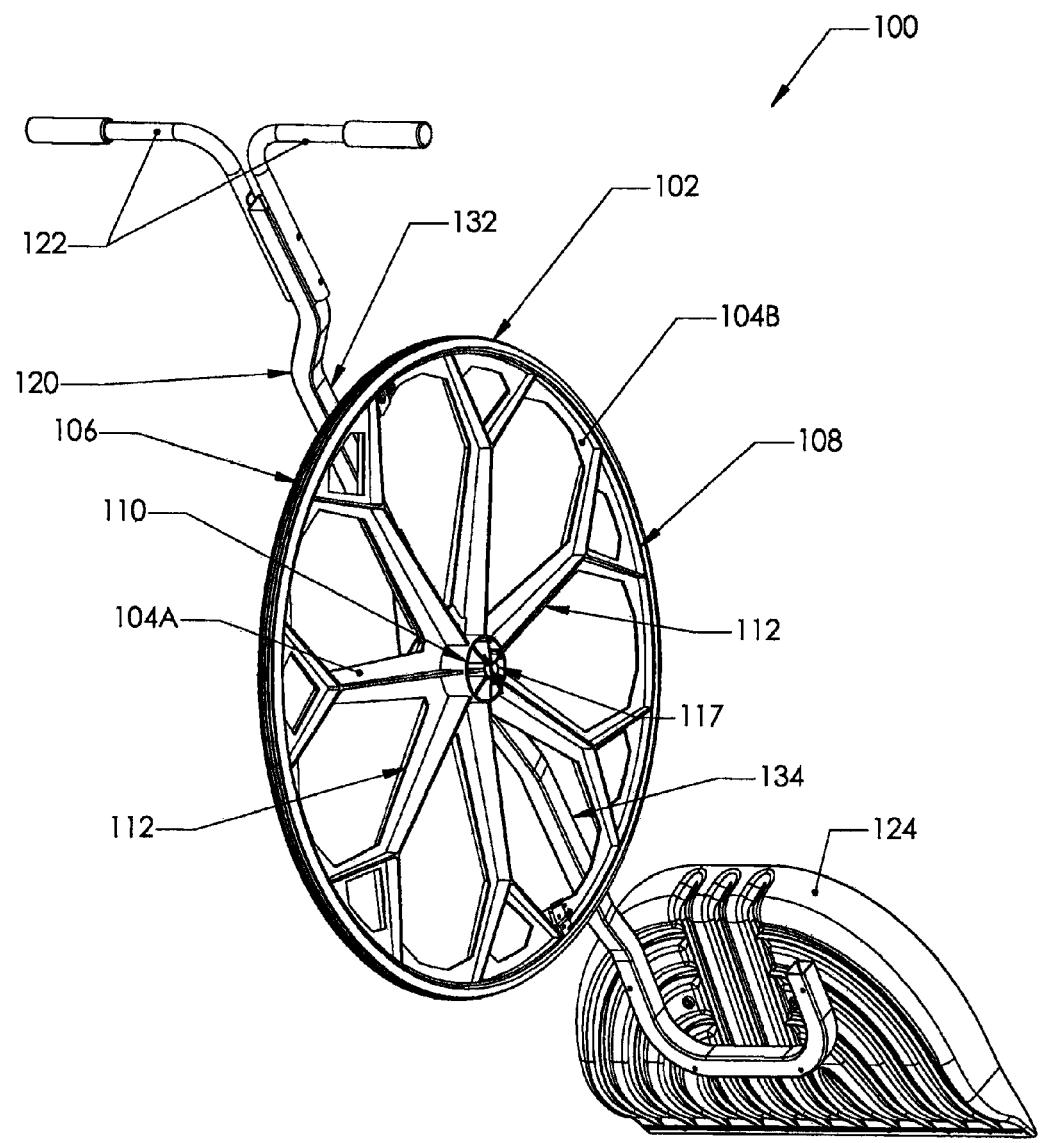
FIG. 2 is a perspective view illustrating the opposite side of the wheeled shovel shown in FIG. 1.

FIGS. 1 and 2 illustrate an exemplary embodiment of a wheeled shovel 100 embodying one or more aspects of the present disclosure. In this particular embodiment, the wheeled shovel 100 generally includes a multi-piece wheel assembly 102 having two wheel pieces 104A and 104B and a tire 106. The various components (e.g., wheel pieces 104A, 104B, tire 106, etc.) of the multi-piece wheel assembly 102 are also shown in FIGS. 3 through 16. As described in more detail herein, the wheel pieces 104A and 104B may be releasably attached, whereupon the assembled wheel assembly 102 may include a rim 108, a mounting hub 110, and members 112 (e.g., spokes, webs, flanges, disk, etc.) extending generally between the rim 108 and mounting hub 110. The mounting hub 110 may be adapted to receive an axle 117. As shown in FIG. 2, the axle 117 may be positioned at least partially within the mounting hub 110 for rotatably mounting the wheel assembly 102 after the first and second wheel pieces 104A, 104B have been releasably attached to each other. As described in more detail herein, the wheel pieces 104A, 104B may also include feature (e.g., tire locking tabs 116A and 116B, protrusions/barb members 118A and 118B, etc.) for helping retain the tire 106 to the rim 108.

With continued reference to FIGS. 1 and 2, the wheeled shovel 100 also includes a driving member, frame, or yoke 120. A handle 122 is disposed at an upper end portion of the driving member 120. A shovel blade 124 is disposed at a lower end portion of the driving member 120. In addition, the wheeled shovel 100 also includes a hinge apparatus 128 (FIG. 1) with two frame linking members 130 that generally link or connect the upper and lower frame portions or members 132, 134.

By way of example, the wheeled shovel 100 or the hinge apparatus 128 may comprise a wheeled shovel or hinge apparatus, respectively, as disclosed in U.S. Provisional Patent Application No. 60/991,218 filed Nov. 29, 2007, titled "HINGE APPARATUS" and/or U.S. Non-Provisional patent application Ser. No. 11/955,753 filed Dec. 13, 2007 titled "HINGE APPARATUS." In other exemplary embodiments, a multi-piece wheel assembly (e.g., 102, 202, etc.) disclosed herein may be used with other wheeled devices or tools besides the wheeled shovel 100 shown in FIGS. 1 and 2, such as with a bicycle, wagon, cart, wheelbarrow, etc. For example, a multi-piece wheel assembly (e.g., 102, 202, etc.) disclosed herein may be used with a wheeled shovel disclosed in U.S. patent application Ser. No. 11/495,916 filed Jul. 27, 2006, published Nov. 30, 2006 under United States Patent Application Publication 2006/0265913. The disclosures of the above patent applications are incorporated herein by reference. In addition, other embodiments may include a multi-wheel assembly (e.g., 102, 202, etc.) as disclosed herein and any one or more (but not necessarily all) of the wheeled shovel components and/or assemblies shown in FIGS. 1 and 2. For example, other embodiments may include a wheeled shovel having a multi-piece wheel assembly (e.g., 102, 202 etc.) disclosed herein but without any hinge apparatus (e.g., 128, etc.) hingedly connecting upper and lower frame members. Further exemplary embodiments may include just the multi-piece wheel assembly itself, e.g., without incorporating the multi-piece assembly into any other product, tool, wheeled shovel, etc. Accordingly, aspects of the present disclosure include multi-piece wheel assemblies and devices that may include multi-piece wheel assemblies. Therefore, the specific references to wheeled shovels herein should not be construed as limiting the scope of the invention.

Figure 8:
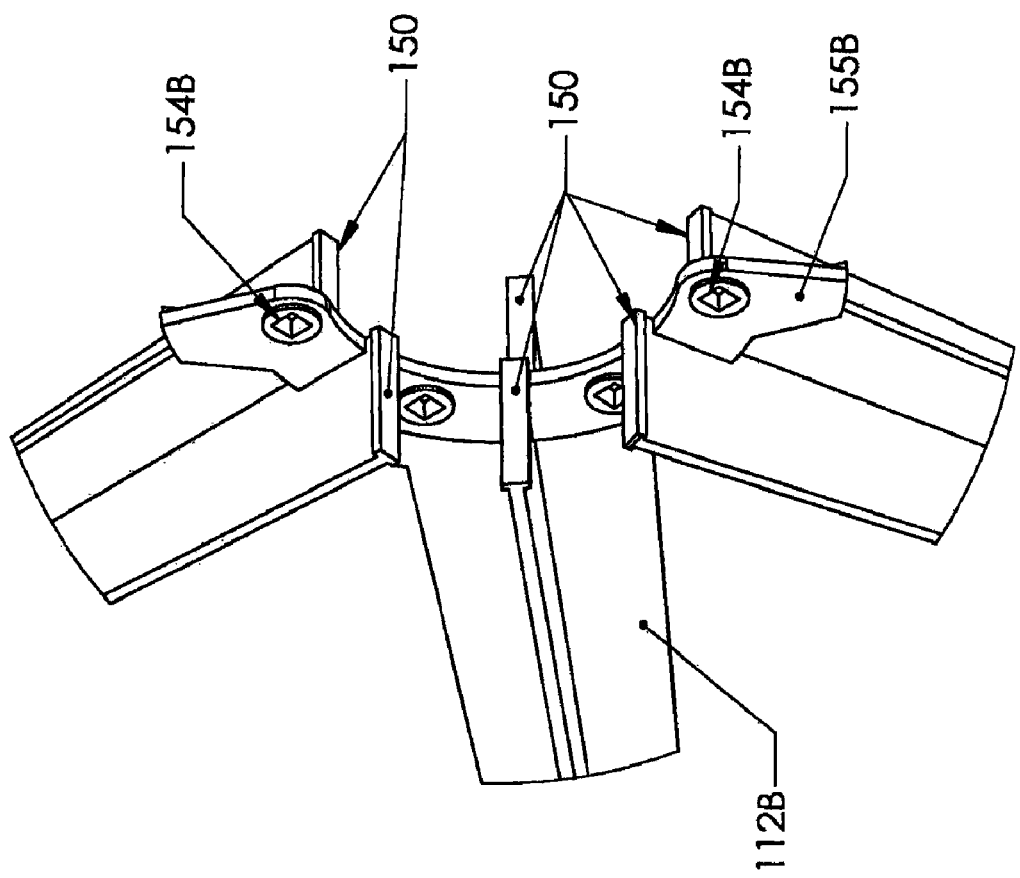
FIG. 8 is a partial perspective view of the wheel piece shown in FIG. 6, and illustrating the generally T-shaped engagement members.

With reference now to FIGS. 3 through 16, the multi-piece wheel assembly 102 will now be described. The multi-piece wheel assembly 102 includes first and second wheel pieces 104A (FIGS. 5 and 7) and 104B (FIGS. 6 and 8). The first and second wheel pieces 104A and 104B are attachable to each other, whereupon the assembled wheel assembly 102 may include rim 108, mounting hub 110, and members 112 (e.g., spokes, webs, flanges, disk, etc.) extending generally between the rim 108 and mounting hub 110.

Figure 4B:
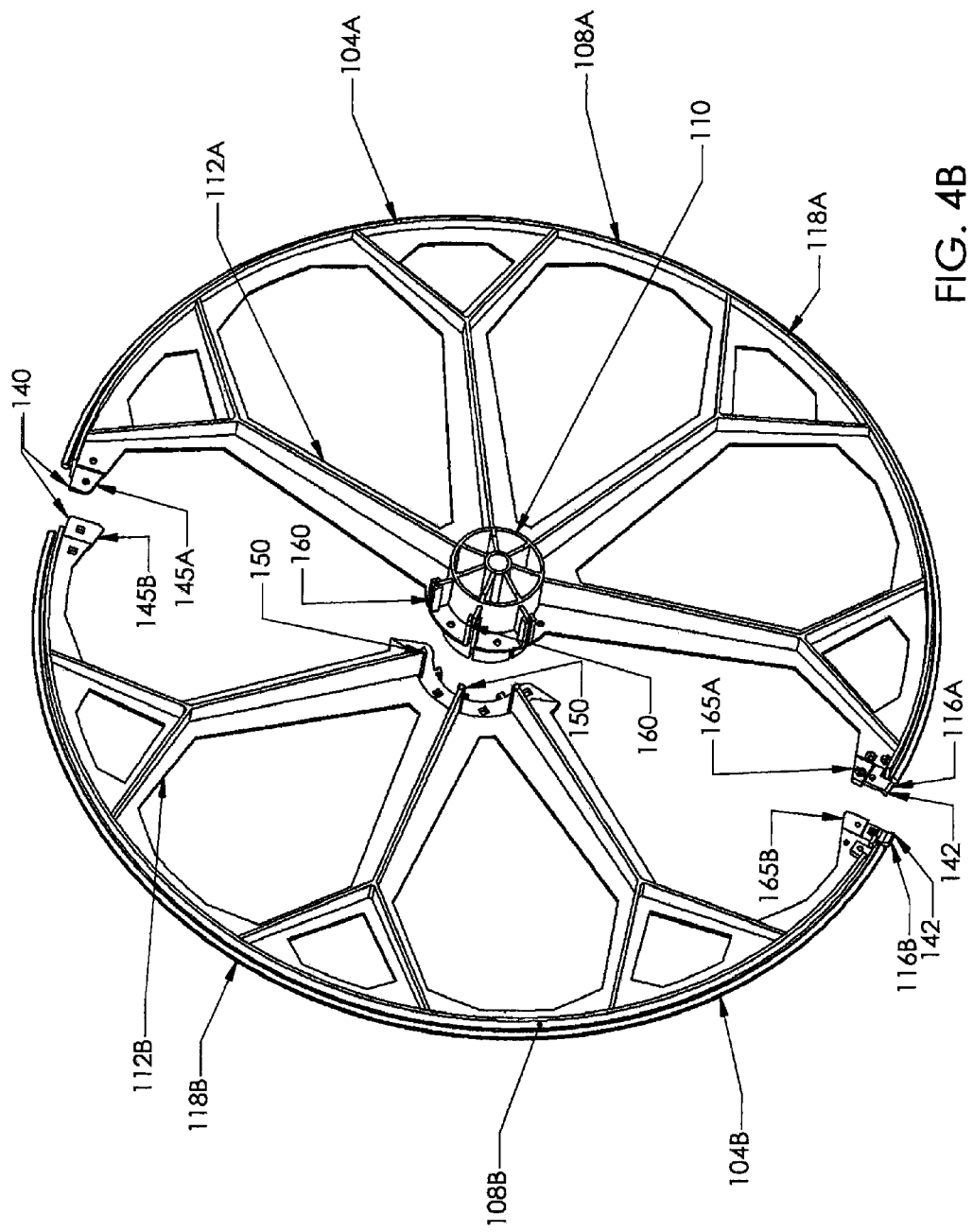
Figure 7:
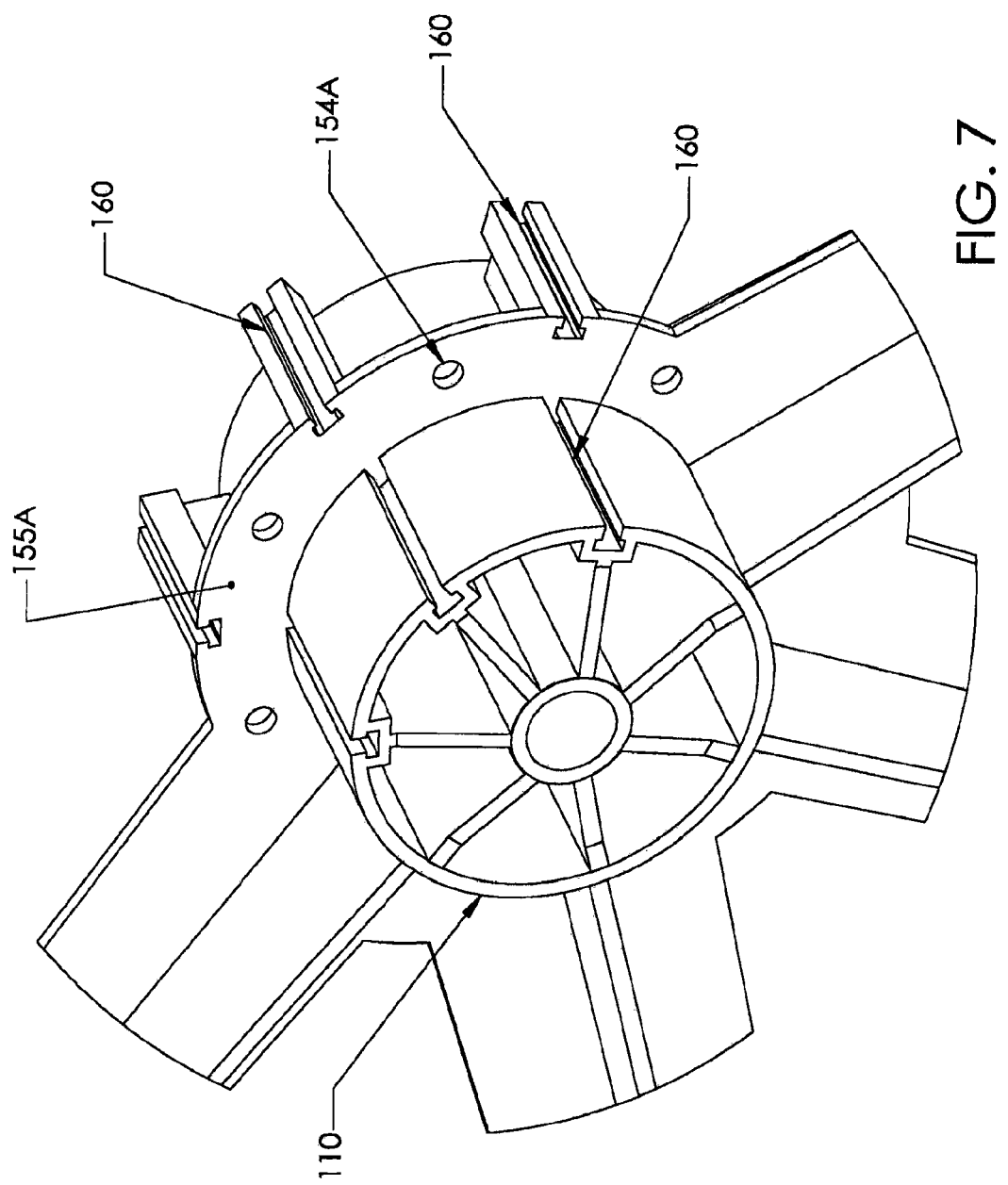
FIG. 7 is a partial perspective view of the wheel piece shown in FIG. 5, and illustrating the hub and slots.

As shown in FIGS. 4A and 4B, the first and second wheel pieces 104A, 104B include respective first and second rim portions 108A, 108B that cooperatively define the rim 108, which is configured for use with the tire 106 (FIG. 3) when the first and second wheel pieces 104A, 104B are attached.

The first and second rim portions 108A, 108B are arced such that they include arced portions or segments of a circle. Accordingly, each of the rim portions 108A, 108B have an arced portion or a segment of a circle that defines only a portion of a circumference of the rim 108, and that collectively define the circumference of the rim 108 when the first and second wheel pieces 104A, 104B are attached. In the illustrated embodiment, the arced portions of the first and second rim portions 108A, 108B are each generally semicircular (FIGS. 4A, 4B, 5, 7) such that each wheel pieces 104A, 104B defines circumferentially about half of the circumference of the rim 108. Alternative embodiments may include one of the wheel pieces defining more than half of the rim's circumference (e.g., three-fourths, two-thirds, etc.) and/or less than half of the rim's circumference (e.g., one-fourth, one-third, etc.). In yet another example, a wheel assembly may have more than two wheel pieces, such as a three-piece wheel assembly where each of the three wheel pieces defines about one-third of the circumference of the rim.

Advantageously, a wheel assembly with releasably attachable wheel pieces may allow for reductions in the required package size (e.g., up to forty percent reduction or more, etc.) for the wheel assembly when the wheel pieces are detached. The reduction in the required package size for the wheel assembly may also allow more components to fits into a shipping container, thus enhancing commercialization for stores (e.g., easy carry out, less inventory space, etc.). In addition, having releasably attachable wheel pieces may also allow for smaller packaging while maintaining a relatively large diameter for the wheel.

As shown in FIG. 5, the first wheel piece 104A includes the mounting hub 110. Alternative embodiments, however, may include the second wheel piece including the mounting hub. Still other embodiments may include the first and second wheel pieces including respective first and second hub portions that cooperatively define the hub when the first and second wheel pieces are attached.

With reference now to FIGS. 3-8, 13, and 14, the illustrated embodiment include first and second wheel pieces 104A, 104B slidably engagable in a first axial direction (generally into the page in FIG. 4) substantially parallel to a rotational axis (through the hub 110) of the wheel assembly 102. The first and second wheel pieces 104A, 104B are slidably disengagable in a second axial direction (generally out of the page in FIG. 3) generally opposite the first axial direction. Other embodiments may include wheel assemblies having one or more pieces that are not slidably engagable.

Continuing with the description of the illustrated embodiment, the first wheel piece 104A includes slots 160 (FIGS. 5, 7, 13) extending in the first axial direction substantially parallel to a rotational axis of the wheel assembly 102. The second wheel piece 104B includes engagement members 150 (FIGS. 6, 8, and 13) that are complementary in shape to and slidably receivable within the corresponding slots 160 of the first wheel piece 104A. The slots 160 are adjacent the hub 110, such that the sliding engagement of the members 150 with the slots 160 may provide greater stiffness and rigidity to the hub portion of the wheel assembly 102 in some embodiments.

By way of example, the engagement members 150 are generally T-shaped in the illustrated embodiment. Alternative embodiments may include differently configured engagement members and/or slots (e.g., different shapes (e.g., L-shaped, etc.), more or less than engagement members and slots, at other locations, etc.). As an example, some embodiments may include the second wheel piece having slots and the first wheel piece having engagement members slidably receivable within the corresponding slots of the second wheel piece. Other embodiments may include the first and second wheel pieces, each of which has at least one slot and at least one engagement member slidably receivable with the corresponding slot of the other wheel piece. Still further embodiments may include wheel assemblies having one or more wheel pieces that do not include any slots or slidable engagement members.

As shown by FIGS. 13 and 14, the first and second wheel pieces 104A, 104B include portions or flange members 155A, 155B, respectively, that overlap axially when the first and second wheel pieces 104A, 104B are slidably engaged as shown in FIG. 14. The flange members 155A, 155B include corresponding fastener hole patterns. When the flange members 155A, 155B are overlapped axially (FIG. 14), the fastener holes 154A of the first wheel piece's flange member 155A align or line up with corresponding fastener holes 154B of the second wheel piece's flange member 155B. In the illustrated embodiment, the fastener holes 154A (FIG. 5 and 7) of the first wheel piece's flange member 155A are generally circular, and the fastener holes 154B (FIG. 6 and 8) of the second wheel piece's flange member 155B are generally rectangular. Alternative embodiments may have differently configured fastener holes 154A, 154B (e.g., more or less than four, different shapes, different sizes, different locations, etc.).

With the fastener holes 154A, 154B aligned, mechanical fasteners 156 (FIGS. 13A, 13B, and 14) may then be used to releasably attach the axially-overlapping portions 155A, 155B to each other. In addition, the flange members 155A, 155B axial overlap adjacent the hub 110 when the first and second wheel pieces 104A, 104B are slidably engaged, such that the mechanical fastening of the axially-overlapping flange members 155A, 155B with fasteners 156 may provide greater stiffness and rigidity to the hub portion of the wheel assembly 102. By way of example, the fasteners 156 may comprise threaded bolts (e.g., ¼" carriage bolts, etc.) and nuts configured to be threaded onto the bolts and shaped (e.g., hexagonal, square, etc.) to be engagingly received within correspondingly shaped recesses (e.g., hexagonal, square, etc.) defined by the wheel pieces 104A, 104B. Alternative embodiments may include other suitable fasteners and attachment methods, such as tight and interfering fitting plastic parts.

As shown in FIGS. 4A and 4B, the first and second wheel pieces 104A, 104B also include portions or tab members 145A, 145B, 165A, 165B, respectively. When the first and second wheel pieces 104A, 104B are slidably engaged (FIG. 3), the tab members 145A, 145B at joint 140 axially overlap each other (FIGS. 3, 9, 11), and the tab members 165A, 165 at joint 142 axially overlap each other (FIGS. 3, 12). The tab members 145A, 145B include corresponding fastener hole patterns. The tab members 165A, 165B also include corresponding fastener hole patterns. Accordingly, slidably engaging the first and second wheel pieces 104A, 104B also positions the tab members 145A, 145B and the tab members 165A, 165B in respective axially overlapping arrangements. This, in turn, aligns the fastener holes 144A of the first wheel piece's tab member 145A with corresponding fastener holes 144B of the second wheel piece's tab member 145B (FIG. 12). The fastener holes 164A, 166A of the first wheel piece's tab member 165A are also aligned with corresponding fastener holes 164B, 166B of the second wheel piece's tab member 165B (FIG. 9, 10, 12). In the illustrated embodiment, the fastener holes 144A, 144B (FIG. 12) and 164A, 164B, 166A, 166B (FIG. 9) are generally circular thru-holes, with the fastener holes 144A, 164B, 166A also including generally rectangular recessed portions. Alternative embodiments may have differently configured fastener holes 144A, 144B, 164A, 164B, 166A, 166B (e.g., more or less than four, different shapes, different sizes, different locations, etc.).

With fastener holes 144A, 144B aligned, mechanical fasteners 146 (FIG. 12) may then be used to releasably attach the axially-overlapping portions 145A, 145B to each other. Similarly, the alignment of the fastener holes 164A, 164B and 166A, 166B allows mechanical fasteners 168 (FIG. 9) to be used to releasably attach the axially-overlapping portions 165A, 165B to each other. By way of example, the fasteners 146, 168 may comprise threaded bolts (e.g., ¼" carriage bolts, etc.), and nuts 148, 170 may be configured to be threaded onto the bolts and shaped (e.g., hexagonal, square, etc.) to be engagingly received within correspondingly shaped recesses (e.g., hexagonal, square, etc.) defined by the wheel pieces 104A, 104B. Alternative embodiments may include other suitable fasteners and attachment methods, such as tight and interfering fitting plastic parts.

Alternative embodiments may include a multi-piece wheel assembly having first and second wheel pieces (e.g., two or more wheel pieces, etc.) that only have axially-overlapping flange members adjacent the mounting hub without any axially-overlapping tab members adjacent the rim portions. Other embodiments may include first and second wheel pieces (e.g., two or more wheel pieces in some embodiments, etc.) that only have axially-overlapping tab members adjacent the rim portions without any axially-overlapping flange members adjacent the mounting hub. Additional embodiments may include first and second wheel pieces (e.g., two or more wheel pieces in some embodiments, etc.) having axially-overlapping portions with corresponding fastener hole patterns located elsewhere besides adjacent the hub or rim portions. Still further embodiments may include a wheel assembly that does not include any such axially-overlapping portions.

With reference to FIGS. 9, 10, and 11, the first and second wheel pieces 104A, 104B include respective protrusions or barb members 118A, 118B extending generally outwardly and circumferentially along the respective first and second rim portions 108A, 108B. The protrusions 118A, 118B may be configured to be engagingly received within a complementary-shaped internal chamber of a tire (e.g., internal chamber 180 of tire 106 (FIG. 15), etc.). The engagement of the first and second wheel pieces' protrusions 118A, 118B with the internal chamber 180 of the tire 106 may help retain the positioning of the tire 106 relative to the rim 108.

As shown in FIG. 16, the protrusions 118A, 118B (and the tire's internal chamber 180 into which they are engagingly received) may have a generally arrowhead shape configured for helping retain the tire 106 to the wheel assembly 102 in a relatively secure and effective manner. Alternative configurations (e.g., shapes, etc.) may also be used for the protrusions.

As shown in FIGS. 4A and 4B, each protrusion 118A, 118B extend circumferentially along the substantial entirety of the corresponding first and second rim portions 108A, 108B of the wheel piece 104A, 104B. Alternative embodiments may include a protrusion extending along less than the entire rim portion (e.g., three-fourths, one-half, etc.).

While the illustrated embodiment includes first and second wheel pieces 104A, 104B, other embodiments may include more or less than two wheel pieces having protrusions. For example, another exemplary embodiment may include a wheel having a protrusion configured to be engagingly received within a complementary-shaped internal chamber of a tire, a rim, a hub, and members (e.g., spokes, webs, flanges, etc.) extending generally the rim and hub, where the protrusion, rim, hub, and members are integrally or monolithically formed with a single component construction. In yet another example, a wheel assembly may have more than two wheel pieces, such as a three-piece wheel where one or more of the three wheel pieces include a protrusion configured to be engagingly received within a complementary-shaped internal chamber of a tire.

FIG. 9 illustrates tire locking tabs 116A, 116B that may be used for locking in place free end portions of a tire (e.g., tire 106, etc.) along the rim 108 without requiring a vulcanized joint, other type of joint, or other bond at the free end portions of the tire, as disclosed herein. Accordingly, exemplary embodiments disclosed herein may allow a piece or strip of extruded rubber to be secured to a wheel rim, which, in turn, may allow for significant cost savings as the rubber extrusion doesn't have to be bonded into a circular loop before installation onto the wheel rim. Alternative embodiments, however, may include rubber or other suitable material is integrally bonded directly to the rim of the wheel assembly, thus forming a tire that does not need to be separately attached and retained to the rim. In one example embodiment, a two-shot injection molding process is used for making a multi-piece wheel assembly having first and second wheel pieces injection molded from plastic, and rubber (or other suitable material) injection molded to the first and second wheel pieces' rim portions to thereby form a tire for the wheel assembly. In such embodiment, the tire would thus not need to be separately attached to the rim portions, thus allowing for the elimination of the tire locking tabs and protrusion.

As shown in FIG. 9, the first wheel piece 104A includes a first tire locking tab 116A extending generally outwardly relative to the first rim portion 108A. The second wheel piece 104B includes a second tire locking tab 116B extending generally outwardly relative to the second rim portion 108B. In operation, the first and second tire locking tabs 116A, 116B may be used for compressively urging the tire 106 (FIG. 16) generally towards the first and second wheel pieces' protrusions 118A, 118B, to thereby help retain the tire 106 to the rim 108. To accomplish this, fasteners 168 may be rotated and tightened to the nuts 170 (and/or into threaded holes in some embodiments), which, in turn, urges, pushes, or pivots the tire locking tabs 116A, 116B generally inwardly and towards the protrusions/barb members 118A, 118. In some embodiments, the tire locking tabs 116A, 116B (along with other portions of the wheel assembly 102) may be molded or otherwise formed from plastic (or other suitable material) such that a living hinge is integrally defined along or adjacent the bottom portion of each tire locking tabs 116A, 116B. In such exemplary embodiments, the living hinges may allow the tire locking tabs 116A, 116B to hingedly or pivotably move inwardly.

In addition, the first and second wheel pieces 104A, 104B may define respective notches or recesses 162A, 162B (FIGS. 9 and 10) that provide clearance for the lower portions of the corresponding tire locking tab 116A, 116B as the tire locking tabs 116A, 116B are pivoting or moving inwardly. With the inward pivoting or movement of the tire locking tabs 116A, 116B, the free end portions of the tire locking tabs 116A, 116B compressively urge, grasp, squeeze, or pinch portions of the tire 106 to the protrusions/barb members 118A, 118B. Accordingly, the tire locking tabs 116A, 116B may thus help to lock the free end portions of the tire 106 in place more securely, as compared to other embodiments in which the wheel assembly does not include tire locking tabs and a tire is retained to the rim by the engagement of the protrusions within the tire's internal chamber. Other embodiments may include alternative means for urging the tire towards the protrusions/barb members. For example, the tire may include one or more chambers or compartments that may be pressurized (e.g., with pressurized air, etc.) or that may be depressurized (e.g., by allowing air to escape the chamber, etc.), which, in turn, may help aid in biasing the tire towards the protrusions/barb members in cooperation with or as an alternative to tire locking tabs.

In the illustrated embodiment, the tire locking tabs 116A, 116B are located at the joint 142. Alternative embodiments may include tire locking tabs 116A, 116B only at the joint 140. Other embodiments may include tire locking tabs 116A, 116B at both joints 140, 142. Further embodiments may include differently configured (e.g., shaped, located, etc.) and/or wheel pieces having more than one tire locking tabs and/or a different number of tire locking tabs 116A, 116B than what is shown in the figures. Accordingly, the use of the terms "first" and "second" locking tabs herein, should not be construed as limiting the claims or embodiments of the wheel assembly to only two locking tabs.

While the illustrated embodiment includes first and second wheel pieces 104A, 104B, other embodiments may include more or less than two wheel pieces having tire locking tabs. For example, another exemplary embodiment may include a wheel having tire locking tabs, a rim, a hub, and members (e.g., spokes, webs, flanges, etc.) extending generally between the rim and hub, where the tire locking tabs, rim, hub, and members are integrally or monolithically formed with a single component construction. In yet another example, a wheel assembly may have more than two wheel pieces, such as a three-piece wheel where each wheel piece defines about one-third of the circumference of the rim. Accordingly, the use of the terms "first" and "second" wheel pieces herein, should not be construed as limiting the claims or embodiments of the wheel assembly to only two pieces.

As shown in FIG. 3, the wheel assembly 102 includes members 112A, 112B, respectively, extending generally between the rim 108 and mounting hub 110. Other embodiments, however, may include a wheel assembly that includes spokes extending generally between the hub and the rim. Additional embodiments may include a non-spoked solid wheel (e.g., solid disk wheel/rim, etc.) with a continuous solid web of material extending generally material extending generally between the hub and the rim.

The particular dimensions for the wheel pieces 104A, 104B may be varied depending, for example, on which particular device or tool the wheel assembly 102 will be used. By way of example only, one particular embodiment includes the first wheel piece 104A integrally defining the entire mounting hub 110 with a generally circular shape having a radius of about 1.75 inches, and also integrally defining the axially-overlapping flange member 155B with a generally semi-circular shape with a radius of about 2.51 inches. The dimensions provided in the above paragraph (as are all dimensions set forth herein) are mere examples provided for purposes of illustration only, as any of the disclosed components herein may be configured with different dimensions depending, for example, on the particular application and/or user.

FIGS. 15 and 15A illustrate an exemplary internal construction for the tire 106. As shown in FIG. 15, the tire 106 includes webbing, webs, or flanges 188 that cooperatively define internal cavities, chambers, or compartments 180, 184, 186. An opening 182 (e.g., slit, slot, etc.) is defined circumferentially along the inner surface portion of the tire 106. The opening 182 is configured to allow the protrusions/barb members 118A, 118B of the respective wheel pieces 104A, 104B to be inserted and engagingly received within the cavity 182, as shown in FIG. 16. Openings 183 (e.g., slits, slots, etc.) are also defined at the tire's free end portions to allow end portions of the corresponding tire locking tabs 116A, 116B of the wheel pieces 104A, 104B to be inserted and engagingly received within the cavities 184, also shown in FIG. 16.

In the illustrated embodiment, the internal chamber 180 is disposed generally between the lateral internal chambers 184 and below the internal chamber 186. The internal chamber 180 is complementary in shape to the first and second wheel pieces' protrusions 118A, 118B. In this particular example, the internal chamber 180 has a generally arrowhead shape corresponding or complimentary in shape to the generally arrowhead shape of the first and second wheel pieces' protrusions 118A, 118. Accordingly, the engagement of the first and second wheel pieces' protrusions 118A, 118B, with the internal chamber 180 of the tire 106 helps retain the positioning of the tire 106 relative to the rim 108. Alternative embodiments may include a tire with different internal constructions, such as tires having more or less cavities or chambers, differently shaped cavities, and/or more or less webs or flanges.

With continued reference to FIG. 15, the tire 106 may also have treads 190 formed by ridges and grooves extending circumferentially along the outermost portion of the tire 106. Alternatively, the tire 106 may have a different tread configuration, or the tire 106 may not have any treads and have a substantially smooth outermost portion.

In various embodiments, the tire 106 may be configured for use as a non-pneumatic airless tire. In other embodiments, the tire 106 may be configured for use as a semi-pneumatic tire in which the tire's free end portions and/or internal chambers are sealed with air therein, but not necessarily pressurized with air. By way of example, the tire may include one or more chambers or compartments that may be pressurized (e.g., with pressurized air, etc.) or that may depressurized (e.g., by allowing air to escape the chamber, etc.), which, in turn, may help aid in biasing the tire towards the protrusion in cooperation with or as an alternative to tire locking tabs. In additional embodiments, however, the multi-piece wheel assembly 102 may include a tire with an air-inflatable tube, a tubeless air-inflatable tire, a non-pneumatic airless tire, a tire having a different internal construction than what is shown in FIG. 15, other non-extruded or extruded tire configurations with different tread arrangements and/or different internal constructions.

The internal construction of the tire 106 shown in FIG. 15 is suitable for an extrusion process such that the tire 106 may be formed by extruding rubber or other suitable extrudable material. Alternative embodiments may include a tire formed by using other processes besides extrusion and/or from other materials besides rubber. The tire 106 may be provided in various lengths depending, for example, on the particular circumference of the rim on which the tire 106 is to be placed.

In exemplary embodiments in which the tire 106 is formed by an extrusion process, the tire 106 may be extruded to have a specific length (e.g., greater than about thirty inches, etc.) corresponding to the circumference of the rim 108 as cooperatively defined by the attached wheel pieces 104A, 104B. The extruded tire material may be positioned generally about the rim 108 of the attached wheel pieces 104A, 104B, such that the protrusions/barb members 118A, 118B are engagingly received through the tire's opening 182 into the tire's internal chamber 180, and such that the corresponding tire locking tabs 116A, 116B are received through the tire's openings 183 into the corresponding internal chamber 184 of the tire 106. Fasteners 168 (e.g., nut and bolt assemblies, ¼ inch carriage bolts, etc.) (FIGS. 9 and 16) may be rotated and tightened to the nuts 170 so as to urge or push the tire locking tabs 116A, 116B generally towards the protrusions/barb members 118A, 118, such that the tire locking tabs 116A, 116B compressively urge, grasp, squeeze, or pinch the portions of the tire to the protrusions/barb members 118A, 118B. In this exemplary manner, the tire 106 may be relatively securely retained to the rim 108, by way of the engagement of the protrusions/barb members 118A, 118B within the cavity 180, and the relatively good compression squeeze or positive lock between the tire locking tabs 116A, 116B and the tire 106. The free end portions of the extruded tire 106 may thus be locked in place without having a vulcanized joint at the end portions of the tire 106. Accordingly, exemplary embodiments disclosed herein may allow a piece or strip of extruded rubber to be secured to a wheel rim, which, in turn, may allow for significant cost savings as the rubber extrusion doesn't have to be bonded into a circular loop or full tire before installation onto the wheel rim. Alternative embodiments, however, may include the tire's free end portions being physically joined to each other (e.g., a vulcanized joint, etc.) before installation to a wheel rim.

In addition, the extruded tire 106 may also be used with other wheel assemblies that includes more or less than two pieces. For example, the extruded tire 106 may be used with a wheel that includes a rim, a hub, and members (e.g., spokes, webs, flanges, etc.) extending generally the rim and hub, where the rim, hub, and members are integrally or monolithically formed with a single component construction. As another example, the extruded tire may be used with a single-piece assembly that includes a rim, a hub, and a substantially solid disk with a continuous web extending generally the rim and hub, where the rim, hub, and disk/web are integrally or monolithically formed with a single component construction.

In some embodiments, the tire may be configured such, when the tire is mounted onto the rim of the wheel assembly, the interface along the tire and the edge portions of the rim is substantially sealed thereby inhibiting the ingress of foreign objects and debris (e.g., dirt, snow, etc.) along the substantially sealed interface into the area defined generally between the tire and the rim. By way of example, the tire's inner surface portion may be configured (e.g., have an at least partially arcuate or rounded profile, etc.) such that, when the tire's free end portions are stretched out and the tire is placed across/on a flat surface, a gap will be defined generally between the flat surface and a middle portion (e.g., at least along the centerline of the tire's inner surface, etc.) of the tire's inner surface portion. When the tire is mounted onto the rim of the wheel assembly, the configuration of the tire's inner surface portion may allow the tire to retain a relatively tight fit against the wheel assembly's protrusion and against the edge portions of the rim such that the interface along the tire and the edge portions of the rim is substantially sealed, thereby inhibiting the ingress of foreign objects and debris (e.g., dirt, snow, etc.) along the substantially sealed interface into the area defined generally between the tire and the rim.

The particular dimensions for the tire 106 may be varied depending, for example, on which particular device or tool the tire 106 will be used. In some embodiments, the tire may be relatively narrow in width, which may prove advantageous, for example, when used with a wheeled shovel because the thin tire may provide the advantage of not packing down snow when shoveling snow (e.g., a narrower wheel can more easily cut through the snow with less resistance, etc.). As another example, the tire 106 may be configured to have an outer diameter (e.g., after being positioned or wrapped about the wheel rim 108, etc.) of greater than about thirty inches. In one exemplary embodiment, the tire 106 is configured so as to have a diameter of thirty-five inches. The dimensions provided in the above paragraph (as are all dimensions set forth herein) are mere examples provided for purposes of illustration only, as any of the disclosed components herein may be configured with different dimensions depending, for example, on the particular application and/or user.

FIGS. 17, 18A, and 18B illustrate another exemplary embodiment of a multi-piece wheel assembly 202 embodying one or more aspects of the present disclosure. As shown, the multi-piece wheel assembly 202 may be similar to the multi-piece wheel assembly 102 already described in at least some embodiments thereof. For example, the multi-piece wheel assembly 202 may again include releasably attachable first and second wheel pieces 204A, 204B, which have respective rim portions 208A, 208B, members 212A, 212B and protrusions 218A, 218B. The first wheel piece 204A may include the entire mounting hub 110 and slots 260 that slidably receive engagement members 250 of the second wheel piece 204B.

In this example embodiment, however, the multi-piece assembly 202 includes joints 240, 242 having different configurations than the joints 140, 142 of the multi-piece wheel assembly 102. As shown in FIGS. 18A and 18B, the multi-piece wheel assembly 202 includes joints 240, 242 having respective axially-overlapping tab members 245A, 245B, 265A, 265B adjacent the rim. But this particular embodiment does not include tire locking tabs 116A, 116B as did the multi-piece wheel assembly 102 as shown in FIG. 9.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence, order, or limitation to only that particular number of elements unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A wheel assembly comprising:
   first and second wheel pieces releasably attachable to each other, the first and second wheel pieces being slidably engagable in a first axial direction substantially parallel to a rotational axis of the wheel assembly, the first and second wheel pieces being slidably disengagable in a second axial direction generally opposite the first axial direction;
   the first and second wheel pieces including respective first and second tire locking tabs and respective first and second rim portions that cooperatively define a rim when the first and second wheel pieces are slidably engaged, each of the first and second wheel pieces including a protrusion extending circumferentially along their respective first and second rim portions; and
   a tire including:
     an outer surface portion;
     an inner surface portion configured for positioning relatively against the rim;
     an internal chamber complementary in shape to the first and second wheel pieces' protrusions for engagingly receiving the first and second wheel pieces' protrusions therein: and
     an opening along the tire's inner surface portion for allowing the first and second wheel pieces' protrusions to be engagingly received within the internal chamber;
     first and second lateral internal chambers disposed such that the internal chamber is generally between the first and second lateral internal chambers;
     first and second openings for receiving at least an end portion of the respective first and second tire locking tabs in the respective first and second lateral internal chambers; and
     free end portions:
   wherein the first and second tire locking tabs retain the tire's free end portions to the rim; and
   whereby the engagement of the first and second wheel pieces' protrusions with the internal chamber of the tire helps retain the positioning of the tire relative to the rim; and
   whereby the first and second tire locking tabs are operable for applying a compressive clamping force to the tire for urging corresponding portions of the tire towards the first and second wheel pieces' protrusions, to thereby help retain the positioning of the tire relative to the first and second wheel pieces' protrusions.

2. The wheel assembly of claim 1, wherein the first wheel piece includes at least one slot extending in the first axial direction; and wherein the second wheel piece includes at least one engagement member complementary in shape to and slidably receivable within the corresponding slot.

3. The wheel assembly of claim 2, further comprising a mounting hub adjacent the at least one slot and at least one engagement member.

4. The wheel assembly of claim 1, wherein the first wheel piece includes at least one T-shaped slot extending in the first axial direction; and wherein the second wheel piece includes at least one T-shaped engagement member slidably receivable within the corresponding slot.

5. The wheel assembly of claim 1, wherein the first wheel piece includes a substantial entirety of a mounting hub for the wheel assembly.

6. The wheel assembly of claim 1, wherein the first and second wheel piece's protrusions have a generally arrowhead shape, and wherein the internal chamber within the tire is complementary in shape to the generally arrowhead shape of the first and second wheel pieces' protrusions.

7. The wheel assembly of claim 1, wherein the opening extends circumferentially along the substantial entirety of the inner surface portion of the tire, and wherein the protrusions extend circumferentially along the substantial entirety of the corresponding first and second rim portions.

8. The wheel assembly of claim 1, wherein each of the first and second rim portions include an arced portion defining only a portion of a circumference of the rim, whereby the arced portions collectively define the circumference of the rim when the first and second wheel pieces are attached.

9. The wheel assembly of claim 8, wherein the arced portions of the first and second rim portions are each generally semi-circular such that each arced portion defines about half of the rim's circumference.

10. A wheel assembly comprising:
    a rim;
    a protrusion extending circumferentially along at least a portion of the rim;
    a tire having inner and outer surface portions, an internal chamber complementary in shape to the protrusion for engagingly receiving the protrusion therein, and an opening along at least a portion of the tire's inner surface portion for allowing the protrusion to be engagingly received within the internal chamber;
    whereby engagement of the protrusion with the internal chamber helps retain the positioning of the tire relative to the protrusion
    first and second tire locking tabs, whereby the first and second tire locking tabs are operable for helping retain the positioning of the tire relative to the rim;
    wherein at least one of the first and second tire locking tabs is connected to the rim by a living hinge integrally defined along a bottom portion of the at least one of the first and second tire locking tabs, whereby the living hinge allows the at least one of the first and second tire locking tabs to hingedly move relative to the rim.

11. The wheel assembly of claim 10, wherein the protrusion has a generally arrowhead shape, and wherein the internal chamber is complementary in shape to the generally arrowhead shape of the protrusion.

12. The wheel assembly of claim 10, wherein the opening extends circumferentially along the substantial entirety of the inner surface portion of the tire, and wherein the protrusion extends circumferentially along the substantial entirety of the rim.

13. The wheel assembly of claim 10, wherein the tire further includes first and second lateral internal chambers disposed such that the internal chamber is generally between the first and second lateral internal chambers, and first and second openings for receiving at least an end portion of the respective first and second tire locking tabs in the respective first and second lateral internal chambers, whereby the first and second tire locking tabs are operable for applying a compressive clamping force to the tire for urging corresponding portions of the tire towards the protrusion, to thereby help retain the positioning of the tire relative to the protrusion.

14. The wheel assembly of claim 10, wherein the wheel assembly includes first and second wheel pieces attachable to each other, wherein the first and second wheel pieces including respective first and second rim portions that cooperatively define the rim and the protrusion when the first and second wheel pieces are attached to each other, and wherein each of the first and second rim portions include an arced portion defining only a portion of a circumference of the rim, whereby the arced portions collectively define the circumference of the rim when the first and second wheel pieces are attached.

15. The wheel assembly of claim 14, wherein the arced portions of the first and second rim portions are each generally semi-circular such that each arced portion defines about half of the rim's circumference.

16. The wheel assembly of claim 14, wherein the first wheel piece includes a substantial entirety of a mounting hub for the wheel assembly.

17. A wheel assembly comprising:
a rim;
first and second tire locking tabs;
a tire having inner and outer surface portions, first and second internal chambers and first and second openings for receiving at least an end portion of the respective first and second tire locking tabs in the first and second internal chambers;
first and second wheel pieces attachable to each other, the first and second wheel pieces including respective first and second rim portions that cooperatively define the rim and a protrusion when the first and second wheel pieces are attached to each other, and wherein each of the first and second rim portions include an arced portion defining only a portion of a circumference of the rim, whereby the arced portions collectively define the circumference of the rim when the first and second wheel pieces are attached;
wherein the first wheel piece includes a substantial entirety of a mounting hub for the wheel assembly;
whereby the first and second tire locking tabs are operable for applying a compressive clamping force to the tire, to thereby help retain the positioning of the tire relative to the rim.

18. A wheel assembly comprising:
a rim;
first and second tire locking tabs;
a tire having inner and outer surface portions, first and second internal chambers and first and second openings for receiving at least an end portion of the respective first and second tire locking tabs in the first and second internal chambers;
wherein the tire includes free end portions, and wherein the first and second tire locking tabs retain the tire's free end portions to the rim.

19. The wheel assembly of claim 18, further comprising a protrusion extending circumferentially along the rim, and wherein the tire includes:
a third internal chamber disposed generally between the first and second internal chambers, and complementary in shape to the protrusion for engagingly receiving the protrusion therein; and
a third opening along the tire's inner surface portion for allowing the protrusion to be engagingly received within the third internal chamber,
whereby the first and second tire locking tabs are operable for applying a compressive clamping force to the tire for urging corresponding portions of the tire towards the protrusion, to thereby help retain the positioning of the tire relative to the protrusion.

20. The wheel assembly of claim 17, wherein the arced portions of the first and second rim portions are each generally semi-circular such that each arced portion defines about half of the rim's circumference.

21. A wheel assembly comprising:
first and second wheel pieces attachable to each other, the first and second wheel pieces including respective first and second rim portions, each of the first and second rim portions including an arced portion defining only a portion of a circumference of a rim such that the arced portions collectively define the circumference of the rim when the first and second wheel pieces are attached;
at least one of the first and second wheel pieces including a mounting hub adapted to receive an axle for rotatably mounting the wheel assembly;
wherein the first wheel piece includes the substantial entirety of the mounting hub.

22. The wheel assembly of claim 21, wherein the first and second wheel pieces including portions with corresponding fastener hole patterns such that when the portions are overlapped axially, at least one fastener hole of the first wheel piece aligns with at least one fastener hole of the second wheel piece for receiving at least one fastener for releasably attaching the axially-overlapping portions to each other.

23. The wheel assembly of claim 22, wherein the axially-overlapping portions include flange members adjacent the mounting hub.

24. The wheel assembly of claim 22, wherein the axially-overlapping portions include tab members adjacent the first and second rim portions.

25. The wheel assembly of claim 21, wherein the arced portions of the first and second rim portions are each generally semi-circular such that each arced portion defines about half of the rim's circumference.

26. A tire for a wheel assembly including a mounting hub, a rim, and a protrusion extending generally outwardly, circumferentially along at least a portion of the rim, the tire comprising:
an outer surface portion;
an inner surface portion;
an internal chamber complementary in shape to the protrusion of the wheel assembly for engagingly receiving the protrusion therein;
an opening along at least a portion of the tire's inner surface portion for allowing the protrusion to be engagingly received within the internal chamber; and
free end portions;
wherein the tire's inner surface portion includes an at least partially arcuate profile such that, when the tire is placed on a horizontal surface, a gap will be defined generally between the flat surface and the tire's inner surface portion at least along the centerline of the inner surface portion, whereby, when the tire is mounted onto the rim of the wheel assembly, the configuration of the tire's inner surface portion allows the tire to be retained against the wheel assembly's protrusion and edge portions of the rim such that the interface along the tire and the edge portions of the rim is substantially sealed, thereby inhibiting the ingress of foreign objects and debris along the substantially sealed interface into the area defined generally between the tire and the rim;
whereby engagement of the protrusion within the internal chamber of the tire helps retain the positioning of the tire relative to the protrusion of the wheel assembly.

27. The tire of claim 26, wherein the internal chamber has a generally arrowhead shape.

28. The tire of claim 26, wherein the tire further includes:
lateral internal chambers disposed such that the internal chamber is generally between the lateral internal chambers; and
webbing separating the internal chamber from the internal lateral chambers.

29. The tire of claim 28, wherein the tire further includes an opening along the inner surface portion for receiving a tire locking tab in each lateral internal chamber.

30. The tire of claim 26, wherein the tire comprises extruded material.

31. The tire of claim 26, wherein the opening extends circumferentially along the substantial entirety of the inner surface portion of the tire.

32. The tire of claim 26, wherein the tire is configured such, when the tire is mounted onto the rim of the wheel assembly, the interface along the tire and the edge portions of the rim is substantially sealed thereby inhibiting the ingress of foreign objects and debris along the substantially sealed interface into the area defined generally between the tire and the rim.

33. A wheeled shovel comprising:
a frame;
a handle disposed at an upper end portion of the frame;
a shovel blade disposed at a lower end portion of the frame;
a wheel assembly coupled to the frame, the wheel assembly including a tire, first and second wheel pieces releasably attachable to each other, and a mounting hub adapted to receive an axle for rotatably mounting the wheel assembly;
the first and second wheel pieces being slidably engagable in a first axial direction substantially parallel to a rotational axis of the wheel assembly, the first and second wheel pieces being slidably disengagable in a second axial direction generally opposite the first axial direction, the first and second wheel pieces including respective:
first and second tire locking tabs;
first and second rim portions including generally semi-circular arced portions each defining about half of a circumference of a rim such that the arced portions collectively define the circumference of the rim when the first and second wheel pieces are slidably engaged;
first and second protrusions extending circumferentially along the respective first and second rim portions;
portions with corresponding fastener hole patterns such that when the portions are overlapped axially, at least one fastener hole of the first wheel piece aligns with at least one fastener hole of the second wheel piece for receiving at least one fastener for releasably attaching the axially-overlapping portions to each other, the axially-overlapping portions including at least one of flange members adjacent the mounting hub or tab members adjacent the first and second rim portions;
the tire including:
an outer surface portion;
an inner surface portion;
an internal chamber complementary in shape to the first and second protrusions for engagingly receiving the first and second protrusions therein; and
an opening along the tire's inner surface portion for allowing the first and second protrusions to be engagingly received within the internal chamber;
first and second lateral internal chambers disposed such that the internal chamber is generally between the first and second lateral internal chambers;
first and second openings along the tire's inner surface portion for receiving at least an end portion of the respective first and second tire locking tabs in the respective first and second lateral internal chambers;
wherein the first tire locking tab is connected to the first wheel piece by a first living hinge integrally defined along a bottom portion of the first locking tab such that first tire locking tab is hingedly movable relative to the first wheel piece; and
wherein the second tire locking tab is connected to the second wheel piece by a second living hinge integrally defined along a bottom portion of the second locking tab such that second tire locking tab is hingedly movable relative to the second wheel piece.

34. The wheel assembly of claim 33, wherein the first and second tire locking tabs are operable for applying a compressive clamping force to the tire for urging corresponding portions of the tire towards the first and second protrusions, to thereby help retain the positioning of the tire relative to the first and second protrusions.

35. The wheel assembly of claim 21, wherein:
the first wheel piece includes a first tire locking tab; and
the second wheel piece includes a second tire locking tab.

36. A wheel assembly comprising:
first and second wheel pieces releasably attachable to each other, the first and second wheel pieces being slidably engagable in a first axial direction substantially parallel to a rotational axis of the wheel assembly, the first and second wheel pieces being slidably disengagable in a second axial direction generally opposite the first axial direction;
the first and second wheel pieces including respective first and second locking tabs and respective first and second rim portions that cooperatively define a rim when the first and second wheel pieces are slidably engaged;
wherein at least one of the first and second tire locking tabs is connected to the corresponding one of the first and second wheel pieces by a living hinge integrally defined along a bottom portion of the at least one of the first and second tire locking tabs, whereby the living hinge allows the at least one of the first and second tire locking tabs to hingedly move relative to the corresponding one of the first and second wheel pieces.

37. A wheel assembly comprising:
first and second wheel pieces attachable to each other, the first and second wheel pieces including respective first and second locking tabs and respective first and second rim portions, each of the first and second rim portions including an arced portion defining only a portion of a circumference of a rim such that the arced portions collectively define the circumference of the rim when the first and second wheel pieces are attached;
at least one of the first and second wheel pieces including a mounting hub adapted to receive an axle for rotatably mounting the wheel assembly;
wherein at least one of the first and second tire locking tabs is connected to the corresponding one of the first and second wheel pieces by a living hinge integrally defined along a bottom portion of the at least one of the first and second tire locking tabs, whereby the living hinge allows the at least one of the first and second tire locking tabs to hingedly move relative to the corresponding one of the first and second wheel pieces.

38. A wheel assembly comprising:
a rim:
first and second tire locking tabs;

a tire having inner and outer surface portions, first and second internal chambers and first and second openings for receiving at least an end portion of the respective first and second tire locking tabs in the first and second internal chambers;

wherein at least one of the first and second tire locking tabs is connected to the rim by a living hinge integrally defined along a bottom portion of the at least one of the first and second tire locking tabs, whereby the living hinge allows the at least one of the first and second tire locking tabs to hingedly move relative to the rim.

* * * * *